(12) United States Patent
Tashman

(10) Patent No.: US 10,417,309 B2
(45) Date of Patent: Sep. 17, 2019

(54) FACILITATING ACTIVE READING OF DIGITAL DOCUMENTS

(71) Applicant: LiquidText, Inc., South Salem, NY (US)

(72) Inventor: Craig Tashman, South Salem, NY (US)

(73) Assignee: LIQUIDTEXT, INC, South Salem, NY (US)

( * ) Notice: Subject to any disclaimer, the term of this patent is extended or adjusted under 35 U.S.C. 154(b) by 355 days.

(21) Appl. No.: 14/885,076

(22) Filed: Oct. 16, 2015

(65) Prior Publication Data

US 2016/0110317 A1 Apr. 21, 2016

Related U.S. Application Data

(60) Provisional application No. 62/064,599, filed on Oct. 16, 2014.

(51) Int. Cl.

| G06F 3/048 | (2013.01) |
|---|---|
| G06F 17/21 | (2006.01) |
| G06F 3/0488 | (2013.01) |
| G06F 3/0484 | (2013.01) |
| G06F 3/0485 | (2013.01) |
| G06T 11/20 | (2006.01) |
| G06F 17/24 | (2006.01) |
| G06F 17/22 | (2006.01) |

(52) U.S. Cl.
CPC .......... *G06F 17/212* (2013.01); *G06F 3/0485* (2013.01); *G06F 3/0488* (2013.01); *G06F 3/04842* (2013.01); *G06F 3/04845* (2013.01); *G06F 3/04883* (2013.01); *G06F 17/2235* (2013.01); *G06F 17/241* (2013.01); *G06T 11/206* (2013.01)

(58) Field of Classification Search
None
See application file for complete search history.

(56) References Cited

U.S. PATENT DOCUMENTS

| 6,714,214 B1 * | 3/2004 | DeMello | G06F 3/0481 715/702 |
|---|---|---|---|
| 7,228,492 B1 * | 6/2007 | Graham | G06F 17/30867 345/440 |
| 9,128,917 B2 * | 9/2015 | Blas, Jr. | G06F 17/212 |
| 2003/0204490 A1 * | 10/2003 | Kasriel | G06F 17/241 |

(Continued)

*Primary Examiner* — William C Trapanese
(74) *Attorney, Agent, or Firm* — Cantor Colburn LLP

(57) ABSTRACT

Review systems and methods facilitate active reading by providing a flexible environment in which users can examine documents. A review system may include a virtual workspace, a document view region, a preview region, and optional document objects. The virtual workspace may simulate a desktop or other physical workspace. The document objects may be created from one or more documents through tools of the review system. These document objects may be independently moveable throughout the virtual workspace as needed to facilitate the user's active reading process, and the document objects within a single workspace may refer to more than a single document. The review system may also include analytical tools enabling the user to analyze his and others' use of the tools as applied to selected documents.

20 Claims, 18 Drawing Sheets

(56) References Cited

U.S. PATENT DOCUMENTS

| | | | |
|---|---|---|---|
| 2009/0164887 A1* | 6/2009 | Ikegami | G06F 17/30905 715/247 |
| 2010/0223257 A1* | 9/2010 | Milic-Frayling | G06F 17/30867 707/722 |
| 2011/0167086 A1* | 7/2011 | Sylthe | G06F 17/30908 707/770 |
| 2013/0191711 A1* | 7/2013 | Tashman | G06F 17/211 715/205 |
| 2014/0026128 A1* | 1/2014 | Rocha De la hoz | G06Q 10/06 717/168 |

* cited by examiner

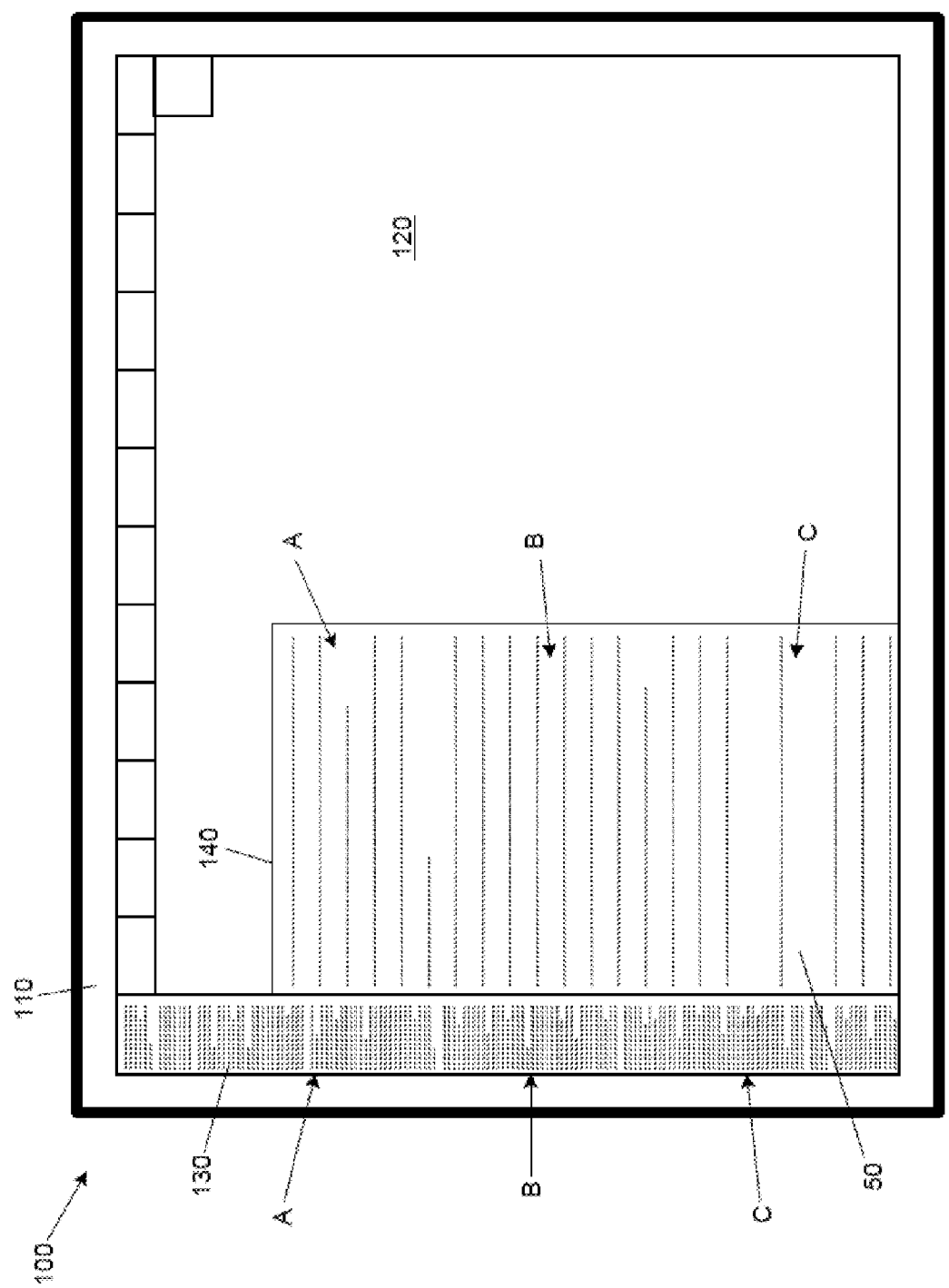

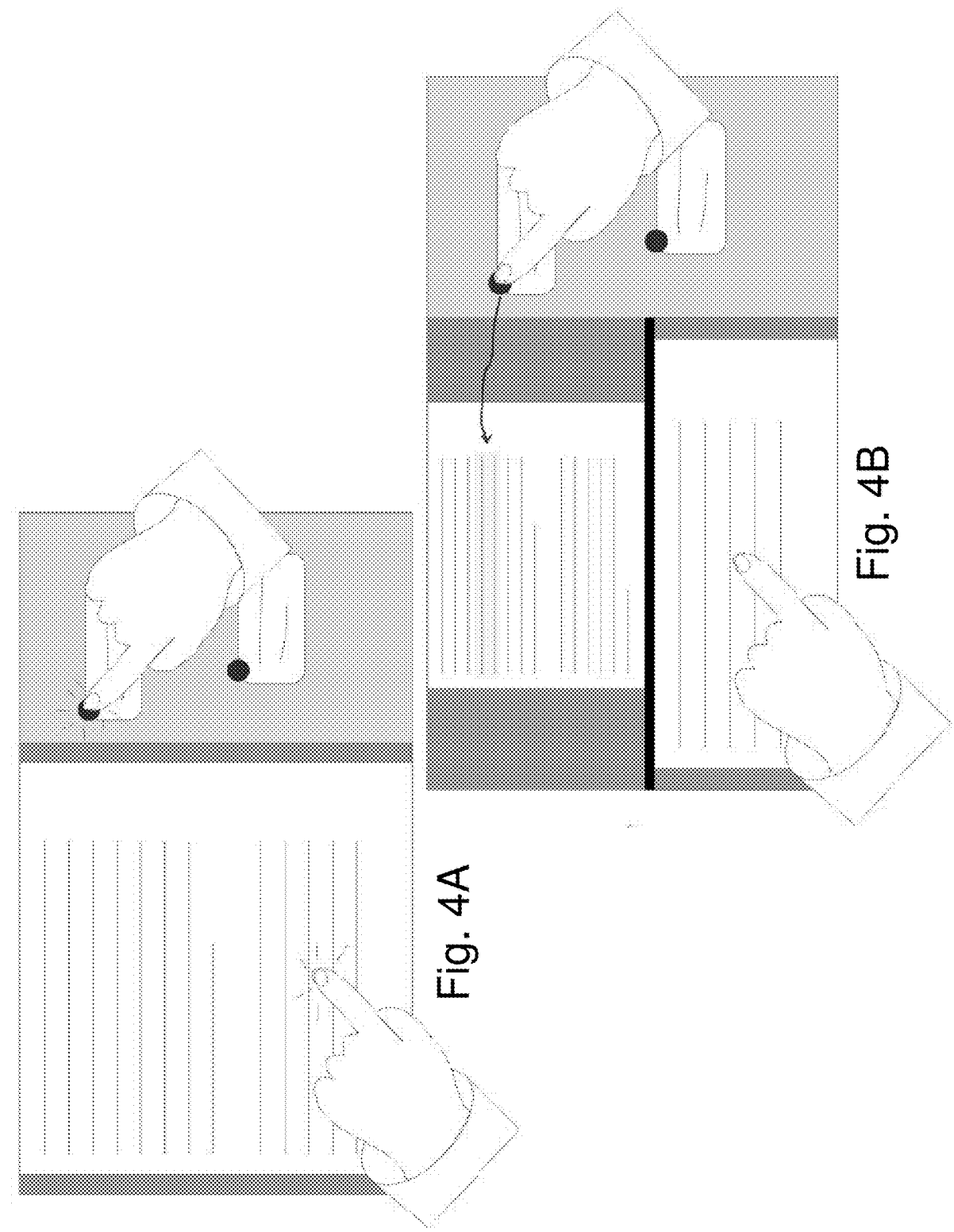

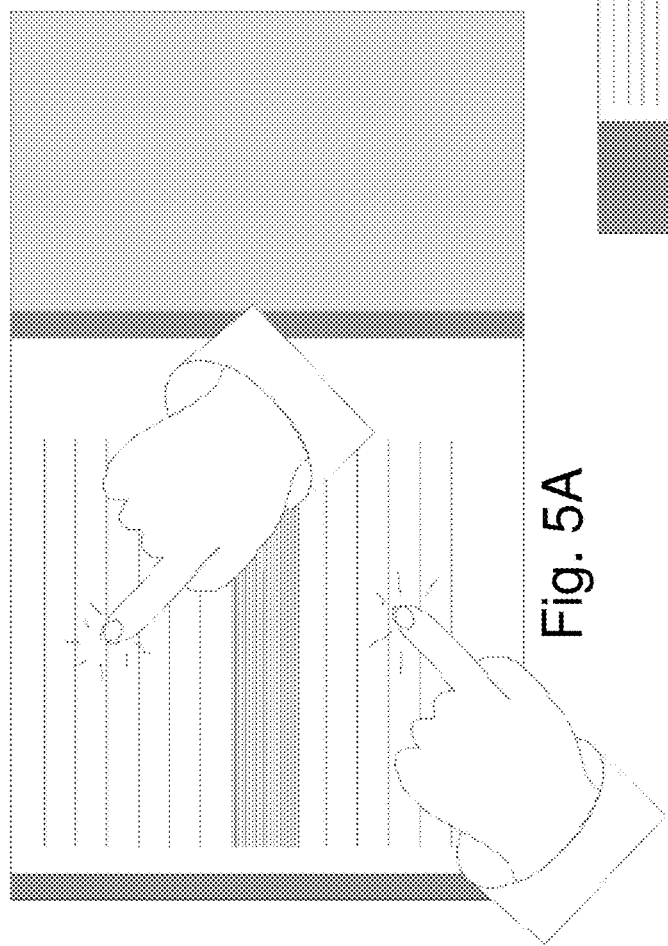
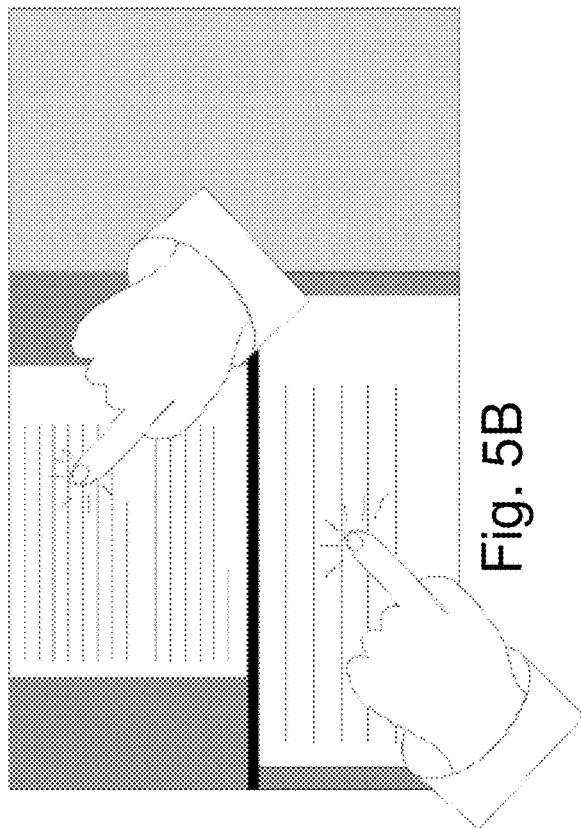

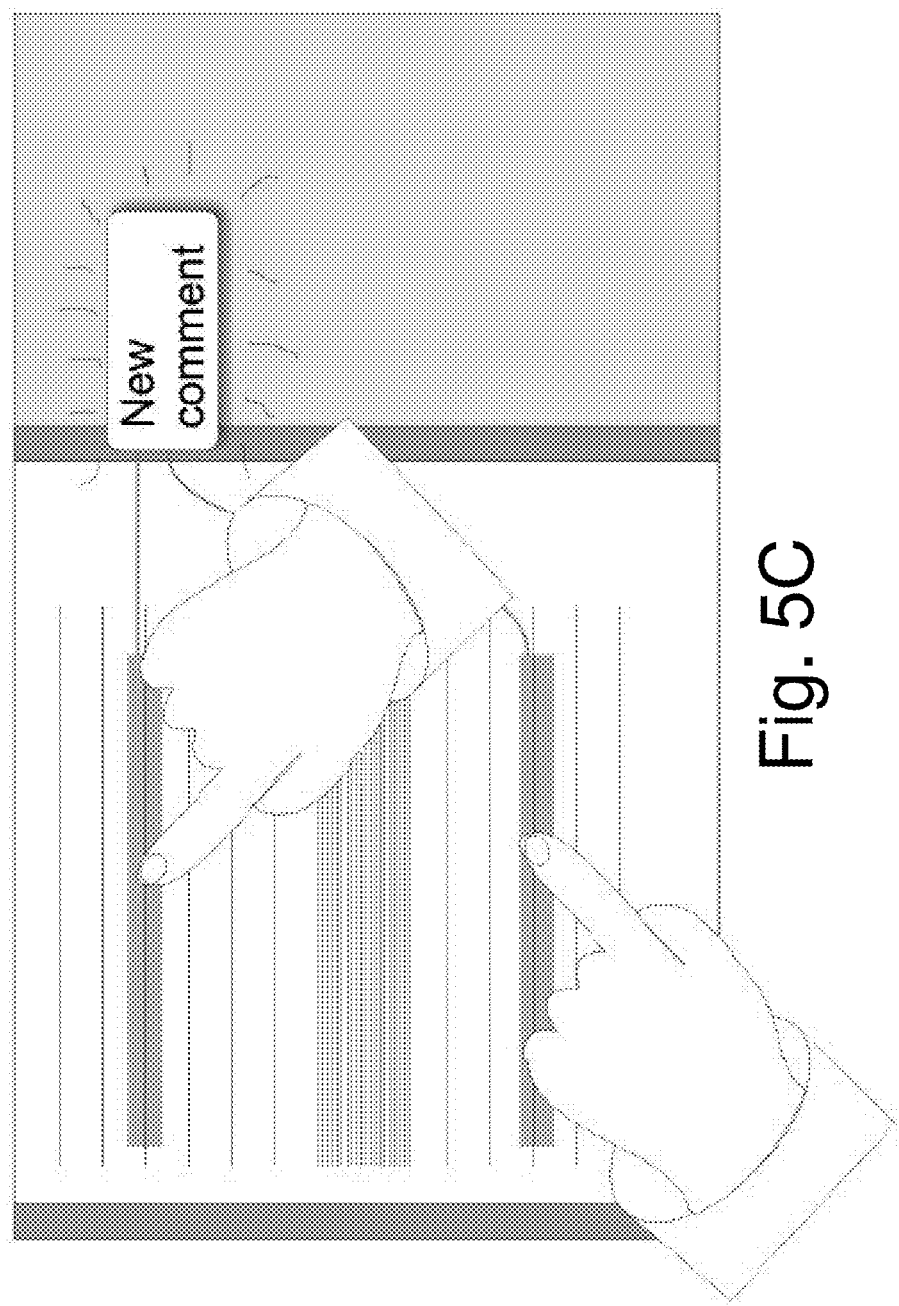

FACILITATING ACTIVE READING OF DIGITAL DOCUMENTS

PRIORITY

This application claims priority and the benefit under 35 U.S.C. § 119(e) of U.S. Provisional Application Ser. No. 62/064,599, filed Oct. 16, 2014, the entire contents and substance which are hereby incorporated by reference as if fully set out below.

TECHNICAL FIELD

Various embodiments of this disclosure relate to digital documents and, more particularly, to facilitating active reading of digital documents.

BACKGROUND

From magazines and novels to review of important documents, reading forms a critical part of our lives, and many reading tasks involve a rich interaction with the text. This rich interaction, known as active reading, can be conducted to answer questions, perform analysis, or obtain information. Active reading may involve highlighting, annotating, outlining, note-taking, comparing, and searching. As a result, active reading generally demands more of a reading medium than simply an ability to advance pages.

Although paper supports bimanual interaction and freeform annotation within the boundaries of a single page, paper lacks the flexibility to provide, for example, content rearrangement, document overviews, and annotation outside of page boundaries. Additionally, although the tangibility of paper supports some rapid forms of navigation, such as dog-earing and bookmarking with a finger, paper provides little flexibility to create a customized navigational structure. Modern pen-based computerized tablets do a fine job of imitating paper, which benefits users by providing a familiar medium, but as a result, these pen-based tablets suffer from the same limitations as paper. Thus, neither paper nor modern computer systems adequately facilitate active reading.

SUMMARY

Briefly described, various embodiments of this disclosure are review systems and methods for facilitating active reading of documents, by providing a fluid-like interface with advantages over physical paper and conventional word processing systems. According to embodiments of this disclosure, a document review system may provide a novel approach to representing and interacting with documents. In contrast to the paper model, which offers a stable but rigid representation, the document review system may provide a highly flexible, malleable document representation. The document review system may provide high degree-of-freedom ways to navigate through and manipulate the document representation, control what document content is displayed and where, and create annotations and other structures related to the document. To this end, the document review system may include a multi-touch, gesture-based user interface.

Active reading involves four core processes: annotation, content extraction, navigation, and layout. Embodiments of the document review system may provide improvements, as compared to paper and conventional word processing, to each of these processes. Some embodiments may also provide analysis of how one or more of the four core processes have been performed on certain documents.

More specifically, in some embodiments, a document review system may include a virtual workspace, a document view region, a preview region, and optional document objects. The system may be embodied in one or more transitory or non-transitory computer-readable media and may be executable by one or more computer processors on a computing device. The computing device may include a multi-touch interface by which a user can interact with the virtual workspace and the overall document review system.

The virtual workspace may be a working environment in which the user can review a document. The virtual workspace may be, for example, a graphical user interface displayed in a virtual window or frame viewable through the multi-touch interface. In some embodiments, the virtual workspace may be designed to look and feel like a physical desktop or other physical workspace to which the user may be accustomed. The virtual workspace may be a relatively unstructured environment, enabling users to place the document objects as desired throughout the virtual workspace.

The document objects may be moveable objects positioned throughout the virtual workspace as desired by the user. In some embodiments, however, such movement may be restricted to areas outside of one or both of the document view region and the preview region, so as not to obstruct these regions. A document object may be created by the user to assist the user in actively reading of the document. For example, and not limitation, the user may create an excerpt of the document or may create an annotation, either of which may be encapsulated in a document object, which may be smaller and more easily manipulable than the document as a whole. Once created, a document object may be freely moved about the virtual workspace, so as to enable the user to arrange the virtual workspace in a manner that creates a customized active reading experience. The document object may be linked to the portion or portions of the document to which the document object relates. For example, the document object may include a visual link, such as an arrow, that the user may touch to cause the one or more documents in the document view region to shift position, thus bringing the related portions into view.

Some embodiments of the review system may be incorporated into plugins for third-party applications. In that case, these applications may inherit one or more of the various features of standalone embodiments of the review system.

Additionally, some embodiments may include analytical tools. These tools may enable a user to analyze the use of document objects with respect to a document and to analyze user interactions with the document itself. As a result, the user can discover which passages of the document are being focused on by other users, and how passages are being viewed together.

In one embodiment, a computer-implemented method includes displaying a first document in a first document view region. A hold gesture is received at a location corresponding to a portion of the first document. An instruction is received to open a second document while the hold gesture at the location remains active. A second document is opened in a second document view region, responsive to receiving the instruction to open the second document while the hold gesture at the location remains active. Opening the second document includes positioning the second document view region based on the location, such that the portion of the first document remains visible and at the location upon opening the second document.

In another embodiment, a computer-implemented method includes displaying a first document in a first document view region. A second document is displayed in a second document view region, such that the first document and the second document are simultaneously visible to a user. A hold gesture is received at a portion of the first document and at a portion of the second document. A document object is generated responsive to the hold gesture. The document object includes a first source link referencing the portion of the first document, where selection of the first source link prompts display of the portion of the first document, and a second source link referencing the portion of the second document, where selection of the second source link prompts display of the portion of the second document.

In yet another embodiment, a computer-implemented method includes displaying a first document in a first document view region. A second document is displayed in a second document view region. A filtering characteristic is received for the first document and the second document. A collapse gesture is received applicable to the first document and the second document. Responsive to the collapse gesture, two or more portions of the first document having the filtering characteristic are identified, and an intermediate portion of the first document positioned between the two or more portions of the first document is identified. Also responsive to the collapse gesture, at least one of the two or more portions of the first document is repositioned by modifying the intermediate portion of the first document in response to the collapse gesture. Also responsive to the collapse gesture, two or more portions of the second document having the filtering characteristic are identified, and an intermediate portion of the second document positioned between the two or more portions of the second document is identified. Also responsive to the collapse gesture, at least one of the two or more portions of the second document is repositioned by modifying the intermediate portion of the second document in response to the collapse gesture. The two or more portions of the first document are closer together after the repositioning the at least one of the two or more portions of the first document, and the two or more portions of the second document are closer together after the repositioning the at least one of the two or more portions of the second document.

The document review system may thus enable users to manipulate documents in a way that improves upon paper and other document manipulation systems. Other objects, features, and advantages of the review system will become more apparent upon reading the following specification in conjunction with the accompanying drawing figures.

BRIEF DESCRIPTION OF THE DRAWINGS

FIGS. 2A-2B illustrate collapsing a document, according to some embodiments of this disclosure.

FIGS. 4A-4B illustrate selecting a source link of a document object referring to a document that is not currently open, while maintaining visibility of some portion of a currently opened document, according to some embodiments of this disclosure.

FIGS. 5A-5C illustrate creating a document object related to two distinct passages of one or more documents, according to some embodiments of this disclosure.

DETAILED DESCRIPTION

Figure 1:
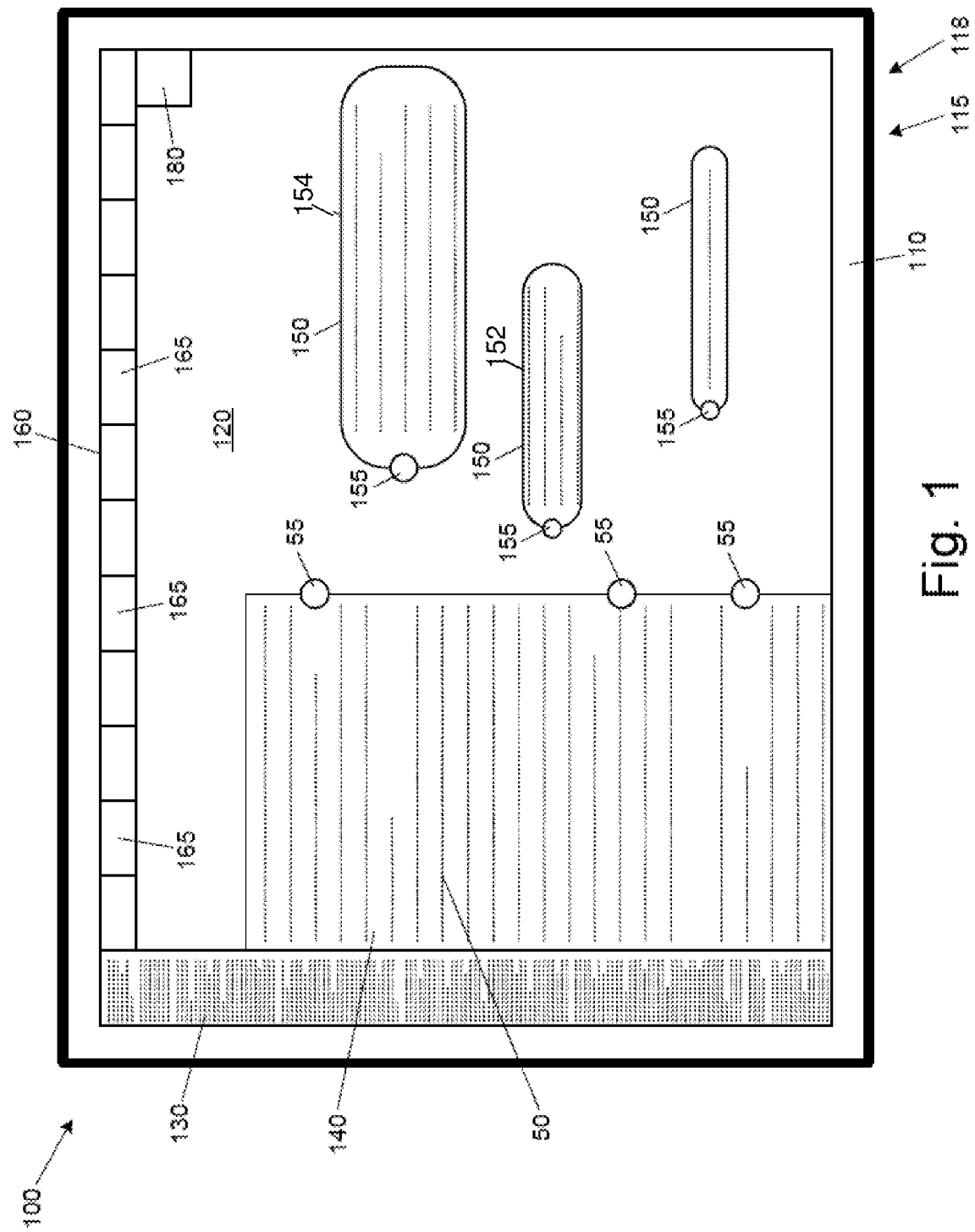
FIG. 1 illustrates a review system, according to some embodiments of this disclosure.

To facilitate an understanding of the principles and features of this disclosure, various illustrative embodiments are explained below. In particular, embodiments of this disclosure are described in the context of being a review system enabling a user to interact with documents in a fluid-like environment, thus facilitating active reading. Embodiments of this disclosure, however, are not limited to this context. Rather, some embodiments may provide a freeform, fluid-like environment for performing a variety of tasks.

The components described hereinafter as making up various elements of some embodiments are intended to be illustrative and not restrictive. Many suitable components that may perform the same or similar functions as components described herein are intended to be embraced within the scope of the disclosure. Such other components not described herein may include, but are not limited to, similar or analogous components developed after this disclosure.

Various embodiments of this disclosure are review systems to facilitate active reading. Referring now to the figures, in which like reference numerals represent like parts throughout the views, various embodiment of the review system will be described in detail.

FIG. 1 illustrates a review system 100, or document review system, according to some embodiments of this disclosure. In some embodiments, the review system 100 may include, for example, a touchscreen input device 110 of a computing device 200, a virtual workspace 120, a preview region 130, one or more document view regions 140, one or more document objects 150, and a toolbar 160.

Various embodiments of the review system according to this disclosure are based on the embodiments of a review system described in U.S. patent application Ser. No. 13/876, 463 (the "'463 application"), filed 27 Mar. 2013, published in U.S. Patent Publication No. 2013/0191711, which is incorporated herein by reference as if fully set forth below. Embodiments of the review system according to this disclosure may include some or all features of the '463 application, including for example, and not limitation, scrolling, fast scrolling, bookmarking, selecting, highlighting, collapsing, excerpting, annotating, and other workspace features. For further example, and not limitation, the document objects 150 referred to herein may include excerpt objects 152 and annotation objects 154, which are described in more detail in the '463 application.

In some embodiments of this disclosure, the touchscreen input device 110 may be a multi-touch input device for interfacing with the virtual workspace 120 and other aspects of the review system 100. The touchscreen input device 110 may be, for example, a multi-touch device capable of receiving multiple simultaneous touches, thus enabling a user to interact with the review system 100 in a natural manner, using multiple hands and fingers simultaneously. A detection system 115 may be integrated with or in communication with the touchscreen input device 110, to detect user interactions with the touchscreen input device 110. These user interactions, or gestures, may be interpreted as commands to the review system 100. Instead of a touchscreen input device 110, the review system 100 may alternatively include some other multi-point, bimanual, or spatial input device capable of receiving gestures interpretable as commands. In some embodiments, the review system 100 may alternatively, or additionally, be operated with a traditional mouse and keyboard where a mapping is defined to map mouse and keyboard commands to gestures performable on the touchscreen input device 110.

The review system 100 may be designed to improve one or more of four major processes that occur in active reading, specifically annotation, content extraction, navigation, and layout, and may also provide features for analyzing how these processes are applied to specific documents. Annotation is defined as text embellishment, including highlighting and marginalia. The review system may provide efficient annotation by enabling convenient switching between annotation tools, by supporting idiosyncratic markings, and by providing a convenient means for retrieving annotations made previously. Content extraction generally includes copying or moving content from a document to a secondary location, such as when outlining or note-taking. In some embodiments, the review system may closely integrate extraction with the reading process, so the user can organize and view extracted content, as well as link extracted content back to the original document. Navigation generally entails moving throughout a document and between multiple documents, such as when searching for text, turning a page, or flipping between selected locations for comparison. The review system may support bookmarks and parallelism to facilitate these or other navigational tasks. Layout generally refers to the visual or spatial arrangement of the document and related objects. The review system may optimize layout according to the user's preferences by enabling distinct portions of the document to be viewed in parallel, while maintaining the document's linearity.

Conventional paper-like approaches fall short in facilitating these processes because of their fixed structure and lack of flexibility. Utilizing a multi-touch input device 110 may provide parallel and bimanual input, which are important parts of paper-based reading, and which also enable a flexible environment. A mouse, as used in most computer-based reading systems, is an inefficient control device because it provides only a single indicator or selector. A keyboard, also used in most computer-based reading systems, lacks natural spatial mapping. The flexible interactions made possible by embodiments of the review system 100 inherently offer more degrees of freedom than traditionally offered by computer-based reading systems. Controlling these interactions with a mouse or a keyboard would be less efficient, requiring numerous sequential inputs to create a single command. In contrast, the multi-touch input device 110 may support multi-point spatial input and is thus capable of efficiently receiving a wide array of gestures for interacting with the review system 100. Despite this, some embodiments of this disclosure may allow the user to use a mouse and keyboard, which may be useful if a touchscreen input device 110 is not available. In such cases, the review system 100 may use an existing mapping to convert mouse and keyboard commands, or sequences of commands, into gestures for controlling the review system 100.

As used through this disclosure, the terms "touch," "hold," and the like need not refer only to physical contact between the user and the touchscreen input device 110. Such terms may refer to various interactions simulating a physical contact, such as pointing from a distance or bringing an implement, such as a finger, hand, or stylus, in close proximity to the touchscreen input device 110, so as to indicate a virtual touching, holding, or the like. The definition of a "touch" may be implementation-dependent, wherein the type of touchscreen input device 110 used may determine how interactions are detected and thus how a "touch" or "hold" is defined. For example, and not limitation, the touchscreen input device 110 may utilize resistive, capacitive, or camera technologies. If, for example, camera technology is used, then a "touch" may be defined based on camera sensitivity, or on an instrument's being within a predetermined distance from the touchscreen input device 110. Additionally, "touch," "hold," and like terms need not refer only to interactions between the user's hands or fingers and the touchscreen input device 110, but may also refer to interactions with an instrument held by the user, such as a stylus, marker, or pen. Further, in cases where a mouse and keyboard are being used, it will be understood that the above terms refer to mouse and keyboard commands and command sequences that are mapped to touch-based gestures.

A display system 118 may be in communication with the detection system 115, the touchscreen input device 110, or both. The display system 118 may react to user gestures by displaying and refreshing a graphical user interface presented to the user, preferably through the touchscreen input device 110, which may perform as both an input and an output device. This graphical user interface may include the virtual workspace 120, the review region 130, one or more document view regions 140, and the document objects 150, all of which will be described in more detail below.

The virtual workspace 120 may be accessible and manipulable through the touchscreen input device 110. The virtual workspace 120 may simulate a physical desktop, in that the user may freely move document objects 150 throughout the workspace 120 without being bound by a fixed structure common in computer-based reading system. In some embodiments, the virtual workspace 120 may contain the preview region 130 and the document view regions 140. In other embodiments, however, the virtual workspace 120 may comprise the useable space of the review system 100 outside of the preview region 130 and the document view regions 140.

When an application embodying the review system 100 is first opened, the review system 100 may present the user with the virtual workspace 120 containing a document 50, or configured to display a yet-to-be-opened document 50. Throughout the active reading process, the user may control the document 50 and other document objects 150 in the virtual workspace 120 with a vocabulary of multi-touch gestures. Through these gestures, the user may navigate, annotate, and manipulate the virtual workspace 120, rarely having to explicitly select tools or otherwise shift attention away from the document 50 at hand. Some basic interactions may be performed in the virtual workspace 120 as one might expect based on conventional touch applications. For example, objects may be repositioned by dragging the objects about the virtual workspace 120. Rescaling may be performed by a pinching or stretching gesture with two fingers, preferably in a horizontal orientation. Other performable gestures and operations, however, are new to the review system 100, as will be described below in detail.

The user may open a document 50 in the virtual workspace 120, and the open document 50 may be displayed in the one or both of the preview region 130 and a corresponding document view region 140. Throughout this disclosure, various actions are described as being performed or performable on the "text" of the open document 50, document object 150, or other component. It will be understood, however, that all or most of such actions may similarly be performed on imbedded objects that are not text, such as images or multimedia. Thus, the term "text" throughout this disclosure is used for illustrative purposes only and is not restrictive.

The preview region 130 may be configured to display the document 50 at a magnification or size that enables the user to view the general layout of the document 50. In some embodiments, the entire document 50 may be viewable in the preview region 130, so as to present the general layout of the entire document 50 to the user. Thus, the preview region 130 may display the document 50 at a lower magnification level (i.e., smaller) than the document 50 appears in the document view region 140. In some embodiments, however, the magnification of the preview region 130 may be adjustable, so that the user may select a magnification size that is best suited to the user's needs.

The document view region 140 may display at least a portion of the open document 50. In some embodiments, the document view region 140 may display the document 50 at a magnification or size enabling the user to easily read the text of the document 50. In a further embodiment, the magnification of the document 50 in the document view region 140 may be modified by the user to enable the user to select a text size best suiting the user's needs.

In some embodiments, more than a single document view region 140 may be provided at a time, where each document view region 140 may display at least a portion of a corresponding document 50. In other words, multiple documents 50 may be visible at once, with a first document 50 displayed in a first document view region 140 and a second document 50 displayed in a second document view region 140.

The text of the document 50 may, in either or both of the preview region 130 and the corresponding document view region 140, be presented to the user in a continuous format, with or without pagination. If pagination is provided, then this provision may be for the user's reference only and need not restrict operations of the review system 100 to page boundaries. Some embodiments of the review system 100 may enable the user to select whether pagination is shown, to further customize the user's active reading experience.

Some embodiments of the review system 100 may provide a collapsing feature, which is not efficiently provided in either paper or conventional computer-based systems. The review system 100 seeks to treat a document 50 in a fluid manner, instead of as a rigid structure. Collapsing is a tool to that end, enabling a user to focus on important parts of the document 50 in the context of the document's original layout, without being distracted by less important portions of the document 50. In essence, collapsing is a process of squishing, minimizing, or squeezing an intermediate portion of the document 50, so as to bring together two portions of the document 50 separated by that intermediate portion.

Figure 2B:
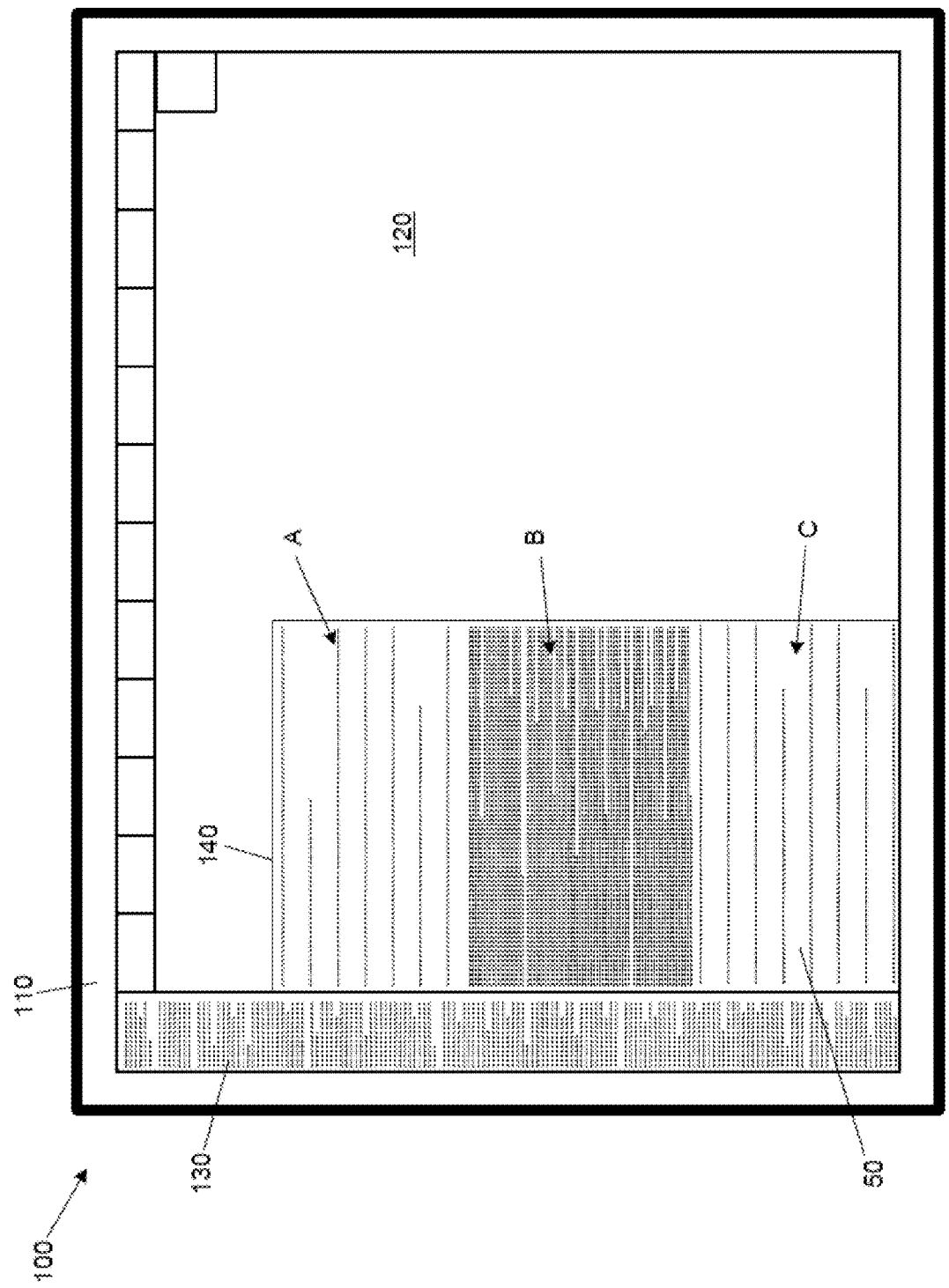

FIGS. 2A-2B illustrate an example of collapsing a document 50, where FIG. 2A shows the document 50 in an uncollapsed state, and FIG. 2B shows the document 50 after being collapsed. As shown by comparing FIGS. 2A and 2B, an intermediate section C of the document 50 may be collapsed to bring separate sections A and C closer together. Although in FIG. 2A, the distinct sections A and C of the document 50 were both simultaneously viewable in the document view region 140 even before collapsing, this need not be the case. In some instances, a first section A may be far removed from a second section C within the document 50, such that both sections would not be simultaneously viewable in the document 50 at a readable magnification, without collapsing the document 50.

Although not illustrated in FIGS. 2A-2B, in some embodiments, more than a single document 50 may be displayed as collapsed at a given time. For instance, a first document 50 may appear collapsed in a first document view region 140 while a second document 50 appears collapsed in a second document view region 140.

The review system 100 may collapse a document 50 in response to a collapse gesture received from the user or, in some cases, in response to other activity performed by the user in the virtual workspace 120. In some embodiments, the collapse gesture may be a pinching gesture, whereby the user places two fingers, usually a thumb and forefinger, on the touchscreen input device 110, and then moves the fingers closer together while maintaining the touch, thus creating a pinching motion. Pinching to initiate collapsing is intuitive because it corresponds to simultaneously scrolling in two directions, where the top finger of the pinch scrolls downward, while the bottom finger scrolls upward. As a result of this opposite-direction scrolling, the document 50 may be collapsed. In response to a collapse gesture, the review system 100 may automatically collapse the document 50 and, more specifically, in the example of FIGS. 2A-2B, may collapse the intermediate section B between the separate sections A and C that were touched by the user in the preview region 130 or the document view region 140.

In some embodiments of the review system 100, a pinching gesture may also be used to change the zoom level of the document 50. Thus, the review system 100 may need to distinguish between pinching used to initiate a collapse and pinching used to initiate zooming. In some embodiments, the review system 100 may test the current zoom level of the document 50 receiving the pinching gesture. If the document 50 is already zoomed at or below a certain threshold (e.g., at or below 100%), then the pinching gesture may indicate a collapse. In contrast, if the zoom level of the document 50 is greater than that threshold, the pinch may cause the review system 100 to lower the zoom level of the document 50. It will be understood that some other embodiments of the review system 100 may use other mechanisms to distinguish between a collapse gesture and a zoom gesture.

Collapsing may provide a number of benefits to the user during active reading. As shown in FIG. 2B, collapsing may enable the user to simultaneously view two distinct sections of the document 50 while retaining the linearity of the document 50 and the context of the two sections A and C. For example, although a portion of the intermediate section B between the distinct sections A and C may not be readable after collapsing, some of the intermediate section B may remain readable, so as to enable the user to see the context of the two sections A and C brought closer together by the collapsing. Retaining the document's linearity may be beneficial to the user because it may enable the user to maintain awareness of where he or she is within the document 50 and, thus, to maintain awareness of the general flow and organization of the document 50. Additionally, because the collapsed portion is still visible to the user, although not necessarily readable, collapsing may provide the user with a visual cue as to the amount of text lying between the two distinct sections A and C of the document 50.

To facilitate efficient collapsing of multiple sections of one or more documents 50, the review system 100 may support collapsing based on filters. For example, and not limitation, if a highlighting filter is set, then the collapse gesture may cause some or all non-highlighted text of one or more documents 50 to collapse. Further, for example, portions that are not highlighted in an indicated color may be caused to collapse. In this way, the review system 100 may enable the user to focus on highlighted portions of the document 50.

In some embodiments, this filtered collapsing may be achieved using the toolbar 160 or a highlight button 180 on or separate from the toolbar 160. For example, and not limitation, while holding the highlight button 180, the user may perform the collapse gesture. In response, the review system 100 may collapse the portions of a document 50 that are not highlighted in the active highlighting color. In some further embodiments, the review system 100 may enable the user to control the extent of the collapsing, so as to display more or less of the text around the highlighted portions as the document 50 is collapsed. If the collapse gesture is performed by vertical pinching, for example, then pinching two fingers very close together may collapse all or virtually all text that is not highlighted in the current color. In contrast, pinching only slightly so that the fingers remain some distance apart may leave some readable text on either side of each highlighted portion during collapsing. Further, the review system 100 may enable the user to select whether the filtered collapsing is to occur on a single document 50, on selected documents 50, or on all displayed documents 50. Thus, highlighting and collapsing may be used together to manipulate the document layout to the user's needs.

In addition or alternatively to highlighting, other characteristics of document text may also be used as a filter during collapsing. Thus, it will be understood that the above description of collapsing based on highlighting can be extended to other forms of filtering characteristics. In some embodiments, for instance, a document 50 may be collapsed with the exception of passages containing provided search terms. For example, when a user enters a search term, the document 50 may automatically collapse, or may collapse in response to a collapse gesture being performed, thus resulting in only passages with the search terms being displayed. Analogously, some embodiments may provide collapsing based on annotations. For example, after indication by the user to do so, the document 50 may collapse to display only passages that are referenced by annotations or annotation objects 154, which, as discussed above, are a form of document objects 150.

The review system 100 may uncollapse all or a portion of collapsed text upon receiving an uncollapse gesture. In some embodiments, for example, an uncollapse gesture may comprise the user's brushing or swiping a hand or finger upward or downward across the collapsed portion. An upward swipe may cause the review system 100 to uncollapse the document 50 upward, so as to maintain the bottom position of the collapsed portion upon uncollapsing. Analogously, a downward swipe may initiate a downward uncollapsing.

In some embodiments, the review system 100 may provide a mechanism for corpus search, or searching a collection of documents 50. The review system 100 may provide a button or other mechanism that the user can use to indicate a desire to enter corpus search mode. After selection of this button, or activation of some other mechanism, the review system 100 may enter corpus search mode and allow the user to search across multiple documents 50. In some embodiments, the review system 100 may search all or a selected subset of all open documents 50. Alternatively, however, the review system 100 may search closed or open documents 50 selected by the user for the corpus search.

Figure 6:
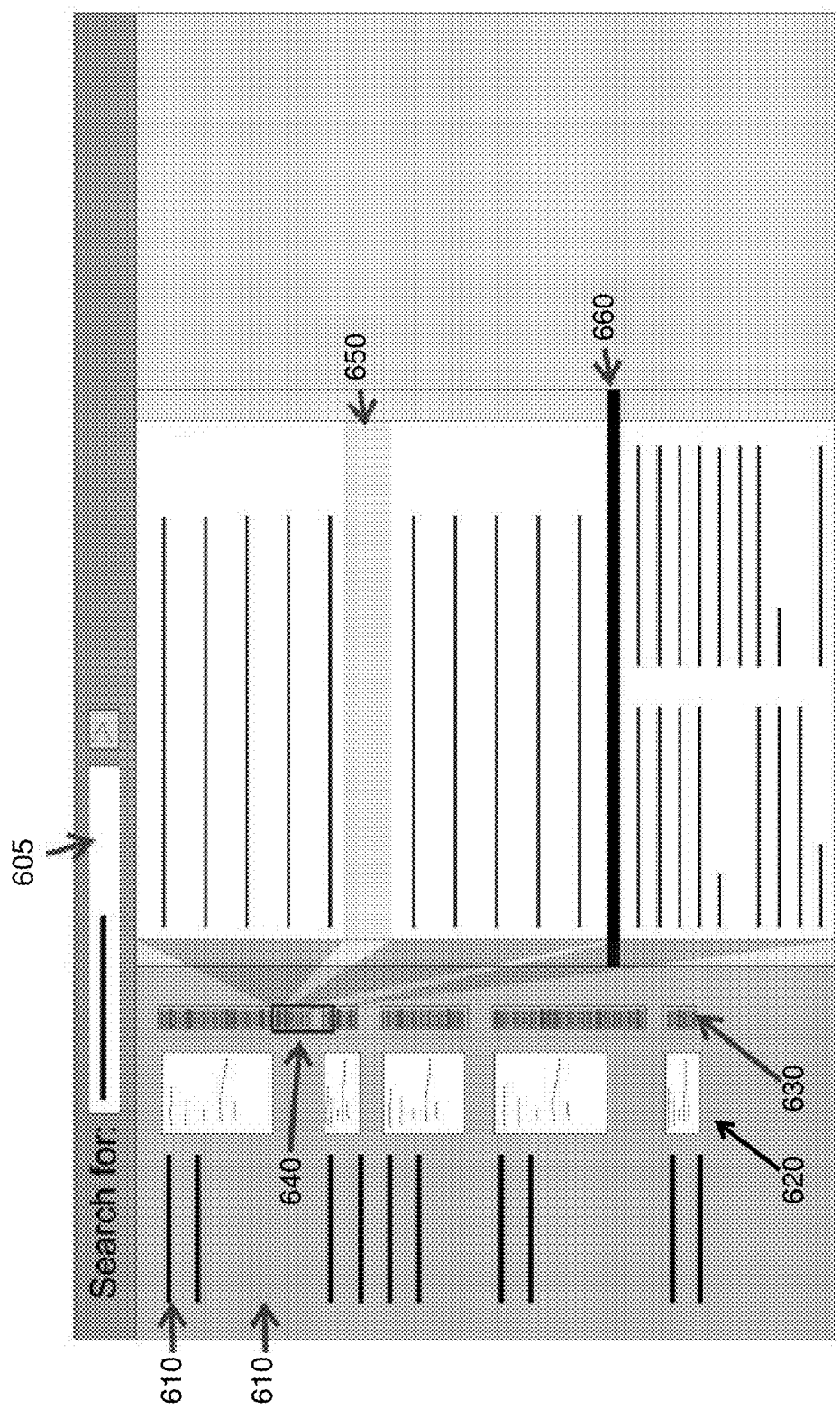
FIG. 6 illustrates a result of a corpus search, according to some embodiments of this disclosure.

FIG. 6 illustrates an example result of a corpus search, according to some embodiments of this disclosure. As shown in FIG. 6, the results page may include various regions, including a searched term region 605, document information region 610, a document image region 620, a searched preview region 630, a selector 640, and a searched view region 650. In some embodiments, these various areas of the search results display may be resizable or zoomable by the user, for the user's convenience.

In the searched term region 605, the user can enter a search term being sought across one or more documents 50 during the corpus search. The review system 100 may search all specified documents 50 with the search term entered in the searched term region 605 and, with the search results, may fill in one or more of the remaining regions displayed in FIG. 6.

The document information region 610 may display a list of some or all the searched documents 50 containing the search term. The list may include information about each document 50 having the search term, including for example, the document title, modification date, and a reminder. The reminder may provide some indication of the user's last activity in the document 50. For example, and not limitation, if the user's last activity was to create, modify, or move an excerpt object 152, the reminder may provide the text of that excerpt object 154.

The document image region 620 may display a miniature image of a portion of each document 50 having the search term. This image may assist the reader in recognizing the documents 50 identified.

In a manner similar to the preview region 130, the searched preview region 630 may display a small version of the text of each document 50 having the search term. Additionally, where the search term occurs in each document 50 as displayed in the searched preview region 630, the review system 100 may emphasize the search term. For example, and not by limitation, each instance the search term may appear in red or in some other color selected by the review system 100 or customized by the user. For another example, each instance of the search term may be highlighted. The use of emphasis can enable the user to identify where in each document the search term occurs without having scroll through the full size documents to find each instance.

The selector 640 may be a rectangle or other shape, and may be moveable by the user to place the selector 640 around desired document portions in the searched preview region 630. When the selector 640 is placed over one or more portions of one or more documents, those portions may then automatically be made visible in the searched view region 650. As shown in FIG. 6, the selector 640 may be large enough to span the separation between two documents 50 as displayed in the searched preview region 630. In this case, as discussed below, more than a single document may be displayed in the searched view region 650.

The searched view region 650 may display the portions of the documents 50 selected by the selector 650, which, as mentioned above, may be moveable by the user. If the selector 640 spans multiple documents 50, as shown in the example of FIG. 6, then the searched view region 650 may include a divider 660, which may separate the searched view region 650 into two or more document view regions 140. More specifically, each divider 660 may separate an upper displayed document 50 from a lower displayed document 50.

The text of the documents 50 displayed in the searched view region 650 may be automatically collapsed to display the search term instances without needing to display all text separating the search term instances. For example, if two instances of the search term are spaced several pages apart, the pages between such instance may be collapsed and therefore unreadable in the searched view region 650, leaving the search term instances and nearby text readable. If the user desires to see more or less text nearby the search term instances, he may perform a collapse gesture or an uncollapse gesture within the searched view region 650 to adjust the amount of text that is collapsed. In some embodiments, the searched view region 650 may be scrollable by the user, enabling the user to further customize which portions of the documents 50 are displayed. As the user modifies the amount of text displayed in the searched view region 650, by collapsing, uncollapsing, scrolling, or other means, the selector 640 may automatically move or resize to reflect what is shown in the searched view region 650.

In some embodiments, the selector 640 may be directly resizable by the user. In that case, when the user resizes the selector 640, the text size within the searched view region 650 may automatically adjust with the size of the selector 640, so as to ensure that all or a substantial portion of search term instances covered by the selector 640 in the searched preview region 630 can fit in the searched view region 650. Alternatively, or additionally, the documents 50 displayed in the searched view region 650 may collapse, further collapse, or uncollapse as the selector 640 is resized, to ensure a proper fit of text in the searched view region 650.

As mentioned above with respect to FIG. 1, the review system 100 may provide for document objects 150 in the virtual workspace 120. Document objects 150 may be objects created by the user to facilitate the user's active reading process. For example, and not limitation, a particular document object 150 may be created by the user, with tools of the review system 100, to represent and include an excerpt or annotation of one or more documents 50. In some embodiments, the virtual workspace 120 may contain document objects 150 associated with multiple documents, such that a first document object 150 in the virtual workspace 120 is associated with a first document 50 while a second document object 50 in the virtual workspace 120 is associated with a second document 50. Each document object 150 may contain text, an image, multimedia content such as a video, or another annotation or portion of the document 50.

Document objects 150, such as excerpt objects 152 and annotation objects 154, may be located in the virtual workspace 120 and manipulable in a manner similar to physical objects in a physical workspace. For example, and not limitation, a document object 150 may be freely moved about the virtual workspace 120 and positioned in the workspace 120 wherever the user desires. Document objects 150 may be placed over one another, so as to hide each other or to bring one document object 150 into view at the expense of the visibility of another document object 150. The size and number of document objects 150 that may be placed on the virtual workspace 120 need not have a predetermined limit, so the user may create and manipulate as many document objects 150 as the user desires to fit into the virtual workspace 120.

A document object 150 may include a link to the portion of the document 50 to which the document object 150 refers. Further, in the case of a document object 150 referring to portions of two or more documents 50, that document object 150 may include a link to each such portion of those two or more documents 50.

For example, and not limitation, an excerpt encapsulated in a document object 150 may contain a source link 155 back to the portion of the document 50 from which the excerpt was extracted, and an annotation encapsulated in a document object 150 may include a link back to the portion of the document 50 being annotated. The source link 155 may have a visible representation, such as an arrow, which may point from the document object 150 to the document view region 140 to indicate that the referred-to portion of the document 50 may be displayed in the document view region 140. When the user selects the source link 155, the document 50 in the document view region 140 may automatically emphasize the portion of the document 50 referred to by the document object 150. For example, and not limitation, the document 50 in the document view region 140 may scroll to bring the referred-to portion of the document 50 into view. In some embodiments, selecting the link may cause the referred-to portion to be centered within the document view region 140. Selection of the source link 155 may occur when the user touches the visible representation of the source link 155.

In the document view region 140, the portion of the document 50 being referred to by a link may contain a destination link 55, referring to the document object 150 doing the referring. Like the source link 155 in the document object 150, the destination link 55 in the document view region 140 may have a graphical representation, such as an arrow. This arrow may be positioned on or near the relevant portion of the document 50 in the document view region 140. When the destination link 55 is selected, the document object 150 referred to by the destination link 55 may be emphasized by the review system 100, to enable the user to locate the document object 150. Emphasis may take various forms. For example, and not limitation, the document object 150 may automatically be placed in front of other document objects 150 that appear in the virtual workspace 120 and that might have blocked the user's view of that document object 150. Alternatively, for example, the document object 150 may flash, change colors, or be emphasized in various other manners to enable the user to locate the document object 150 as a result of the user's selection of the destination link 55 within the document 50.

As mentioned above, selecting a source link 155 of a first document object 150 may cause the related portion of the document 50 to be emphasized in the document view region 140. Alternatively, however, if the source link 155 connects to another document object 155, as will be described further below, then when the source link 155 is selected, that other document object 150 may be automatically brought into view over or in parallel with other document objects 150. In some embodiments, a source link 155 may refer to more than a single portion of the document 50 or more than a single document object 150. If multiple portions of text in the document 50 or other document objects 150 are referred to by a selected source link 155, or if multiple source links 155 of the first document object 150 are selected, or if multiple source links 155 of multiple document objects 150 are selected, then the document 50 in the document view region 140 may collapse, scroll, or collapse and scroll as needed to simultaneously display all portions of the document 50 and document objects 150 referred to by the selected source links 155. Thus, the review system 100 may establish sets of bidirectional links, with each set including at least one source link 155 and at least one destination link 55, enabling the user to maintain a connection between portions of the document 50 and related document objects 150.

Some embodiments of the review system 100 may enable some document objects 150 to refer back to other document objects 150. In other words, a second document object 150 may be created to refer to an existing first document object 150. In that case, the second document object 150 may include a source link 155 referring back to the first document object 150, which represents the source referred to by the second document object 150. The first document object 150 may include a destination link 55 referring back to the second document object.

In some further embodiments, a document object 150 may be created based on two or more existing document objects 150. For example, and not limitation, an annotation object 154 may be created to comment on a relationship between an existing first document object 150 and an existing second document object 150. Various mechanisms may be provided for the user to initiate creation of such an annotation object 154, or other type of third document object 150 based on one or more existing document objects 150. For example, and not limitation, the user may select one or more existing document objects 150, such as by tapping them in the virtual workspace 120. When a selection is made, the review system 100 may provide a "comment" button, menu bar, or other option enabling the user to indicate his desire to comment on the selected one or more document objects 150. After the user indicates this desire, such as by selecting the "comment" button, the review system 100 may create a new annotation object 154, which may have initially empty comment text, which the user can fill by typing a comment.

In some embodiments, the review system 100 may provide capabilities to work with two or more documents at once. For example, the review system 100 may provide two or more document view regions 140 in a single virtual workspace 120, where each document 50 is displayed in its own document view region 140. Some embodiments may also include a preview region 130 associated with each document 50 and corresponding document view region 140 within the virtual workspace 120. Within the virtual workspace 120, document objects 150 associated with the two or more documents 50 may be interspersed together. The various features of the review system 100 may thus be applied to all of the two or more documents 50. In this manner, the review system 100 may enable the user to make connections within a single document 50 and among two or more documents 50.

For example, the review system 100 may enable the user to drop a document object 150 from the current virtual workspace 120 into another virtual workspace 120. In some embodiments, this may be achieved when the user drags a document object 150 in the current workspace up to the toolbar 160, to a predetermined area of the toolbar 160 designated for accessing other virtual workspaces 120, or to some other predetermined location. When this occurs, the review system 100 may take this motion as an indication of the user's desire to place the document object 150 in another virtual workspace. While the user maintains his hold on the document object 150, the review system 100 may open a dialog showing representations of other available or recently opened virtual workspaces 120. The user can then drag the document object 150 to the representation of a second virtual workspace 120, and then release his hold on the document object 150. As a result of this motion, the review system 100 may then add the document object 150 to the second virtual workspace 120. If that document object's source link 155 refers back to a present document 50 in the current virtual workspace 120, then selecting that source link 155 at a later time while in the second virtual workspace 120 may open the present document 50, even if the present document 50 does not currently exist in that second workspace 120.

FIGS. 3A-3D, 4A-4B, and 5A-5C illustrate examples of some other cross-document operations that may be provided by the review system 100 to work with multiple documents 50 at once.

Specifically, FIGS. 3A-3D illustrate a manner of opening a second document 50 in a virtual workspace 120 while maintaining a position in an open first document 50. It may be the case that, using a traditional manner of opening documents, the virtual workspace 120 may be hidden while selecting a document 50 to open. Thus, the first document 50 would be hidden while opening the second document 50 in this traditional fashion. FIGS. 3A-3D illustrate an alternative opening mechanism enabling the user to not only retain his view of the first document 50, but also to maintain his place in the first document 50 while the second document is being opened.

Figure 3A:
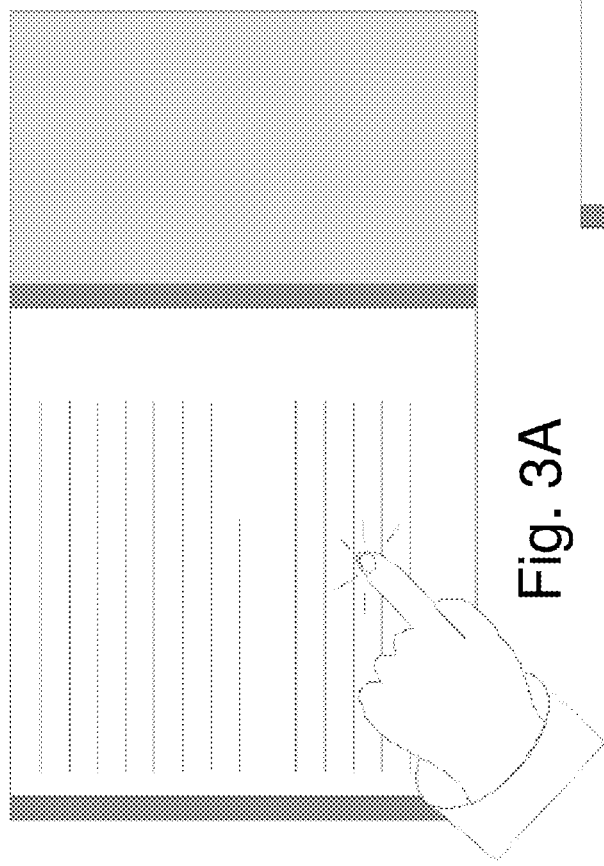
FIGS. 3A-3D illustrate opening a second document in a virtual workspace while maintaining a position in an open first document, according to some embodiments of this disclosure.
Figure 3B:
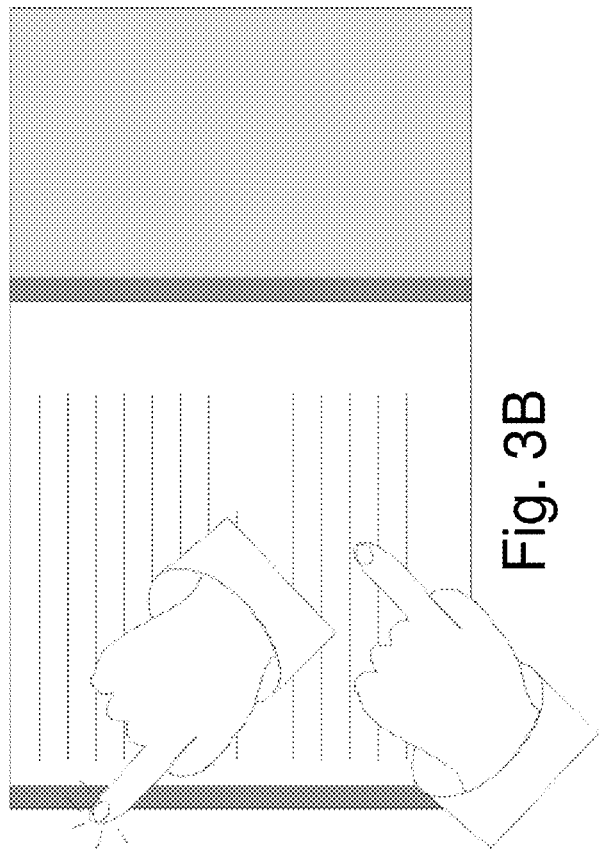
Figure 3D:
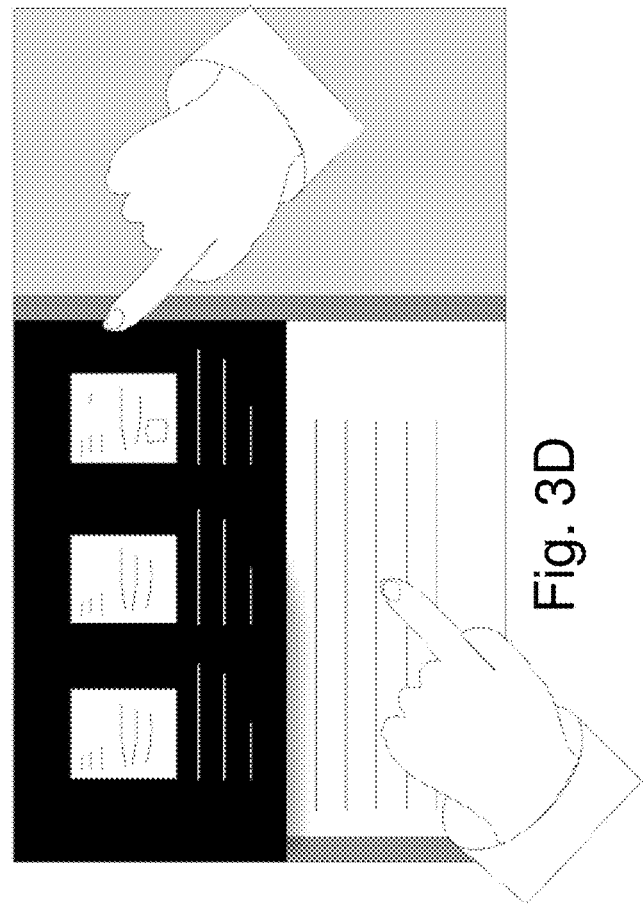
Figure 3C:
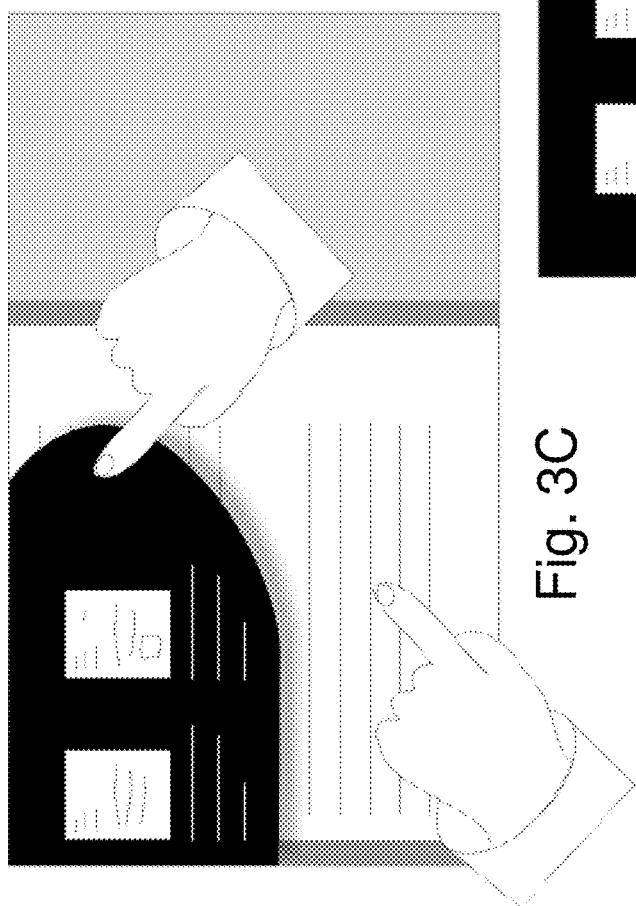

As shown, in FIG. 3A, the user may use a first finger to hold a position in the document 50 displayed in a first document view region 140. With a second finger (e.g., on the other hand), while holding the position with the first hand such that a hold gesture remains active at that position, the user may access a document-selection dialog allowing him to open an additional document 50. For example, and not limitation, as shown in FIG. 3C, the user may use the second finger to touch a predetermined region of the virtual workspace 120 for opening the dialog. In FIG. 3C, the user may drag the second finger to the right to more fully display the open-document dialog. In FIG. 3D, when the document-selection dialog is fully open, the user may lift the second finger and use it to select within the document-selection dialog a second document 50 to open. It should be noted that, throughout the actions shown in FIGS. 3B-3D, the user maintains the touch made with the first finger in FIG. 3A, thus maintaining his place in the first document 50. In some other embodiments, however, the user may release the touch after beginning to open the document-selection dialog, and the review system 100 may still hold the user's position in the first document 50. In response to selecting a second document 50 to open, the second document 50 may the open in a new document view region 140 in the existing virtual workspace 120.

As mentioned above, the document objects 150 within a single virtual workspace 120 may include document objects 150 related to more than a single document 50. FIGS. 4A-4B illustrate what happens when selecting a source link 155 of a document object 150 referring to a document 50 that is not currently open. As shown, in FIG. 4A, the user may use a first finger to touch a position in the document 50 displayed in a first document view region 140. With a second finger (e.g., on the other hand), while holding the position with the first finger, the user may select a source link 155 of a document object 150, where the source link 155 refers to a portion of a second document 50 not currently open or displayed in the virtual workspace 120. In response to receiving the touch on the source link 155, the review system 100 may display the second document 50 in a second document view region. In other words, if the second document 50 is not yet open in the virtual workspace 120, the review system 100 may open it and make it viewable in a second document view region 140; and if the second document 50 is already open but hidden, the review system 100 may bring it to the front of other objects in the virtual workspace 120 to make it viewable in the second document view region 140.

More specifically, as shown, the review system 100 may display the second document 50 in a position of the virtual workspace 120 other than the place currently touched by the user's first hand. The user's first hand, holding the position in the first document 50, may indicate to the review system 100 that the user desires to keep the first document 50 in its current location at the held position. Thus, because, in FIG. 4A, the user is holding the first document 50 in the lower half of the virtual workspace 120, the review system 100 may display the second document 50 in the upper half of the virtual workspace 120. Alternatively, if the user holds a passage of the first document 50 displayed in the top half of the document view region 140, the review system 100 may then open the second document 50 and the second document view region 140 in the lower half of the virtual workspace 120. More generally, the review system 100 may determine where to display the second document 50 based in part on the location at which the user is holding the first document 50. As a result, the user would be able to maintain the touched place of the document 50 in its exact position within the virtual workspace 120.

FIGS. 5A-5C illustrate a manner of creating a document object 150, specifically an annotation object 154, related to two distinct passages of one or more documents 50. Such a comment might be useful, for example, if the two passages relate to each other but the user desires to provide a comment about that relationship. That comment may then be encapsulated in the document object 150 connecting the two passages. FIG. 5A illustrates initiating the creation of such a document object 150 where the two passages belong to a single document 50, while FIG. 5B illustrates initiating the creation of such a document object 150 where the two passages belong to two different documents 50. As shown in FIGS. 5A-5B, the user may use one finger to touch a first passage and another finger to touch a second passage. After the two touches are held for a predetermined amount of time, e.g., two seconds, the review system 100 may interpret the touches as a request to connect the two passages with a comment. As a result, the review system 100 may create an annotation object 154 including an initially empty comment, as shown in FIG. 5C. If the two touches resulting in the annotation object 154 are in different documents 50, then the annotation object 154 may include a source link 155 to the two distinct documents 50. If the user types after the annotation object 154 has been created, and before another action is initiated, the typed characters may then automatically become the comment encapsulated in the annotation object 154.

Some embodiments of the review system 100 may be incorporated into plugins for third-party applications, such as third-party reading applications with Microsoft Word® and Adobe Acrobat®, and some embodiments may be incorporated into plug-ins that integrate into websites, like CNN®. When installed, such a plugin may cooperate with the third-party application or web server to provide some or all of the functionality of the standalone review system 100 to facilitate active reading within the third-party application or website. For example, and not limitation, the plugin may provide a virtual workspace 120, a preview region 130, a document view region 140, and a toolbar 160. The plugin may further provide features of the standalone review system 100, including, for example, the creation of document objects 150, such as excerpt objects 152 and annotation objects 154. Some plugin embodiments may support cross-document features, where the documents in question need not be accessed within the same applications or websites, thus providing cross-application features as well.

Various embodiments of the review system 100 may be configured to provide analytics to assist users in analyzing how one or more users are applying the features of the review system 100 to certain documents. For example, the review system 100 may include one or more of the following analytical tools, whose example results are illustrated in FIGS. 7-14. In some embodiments, other analytical tools may be provided in addition to or instead of the following tools.

Figure 7:
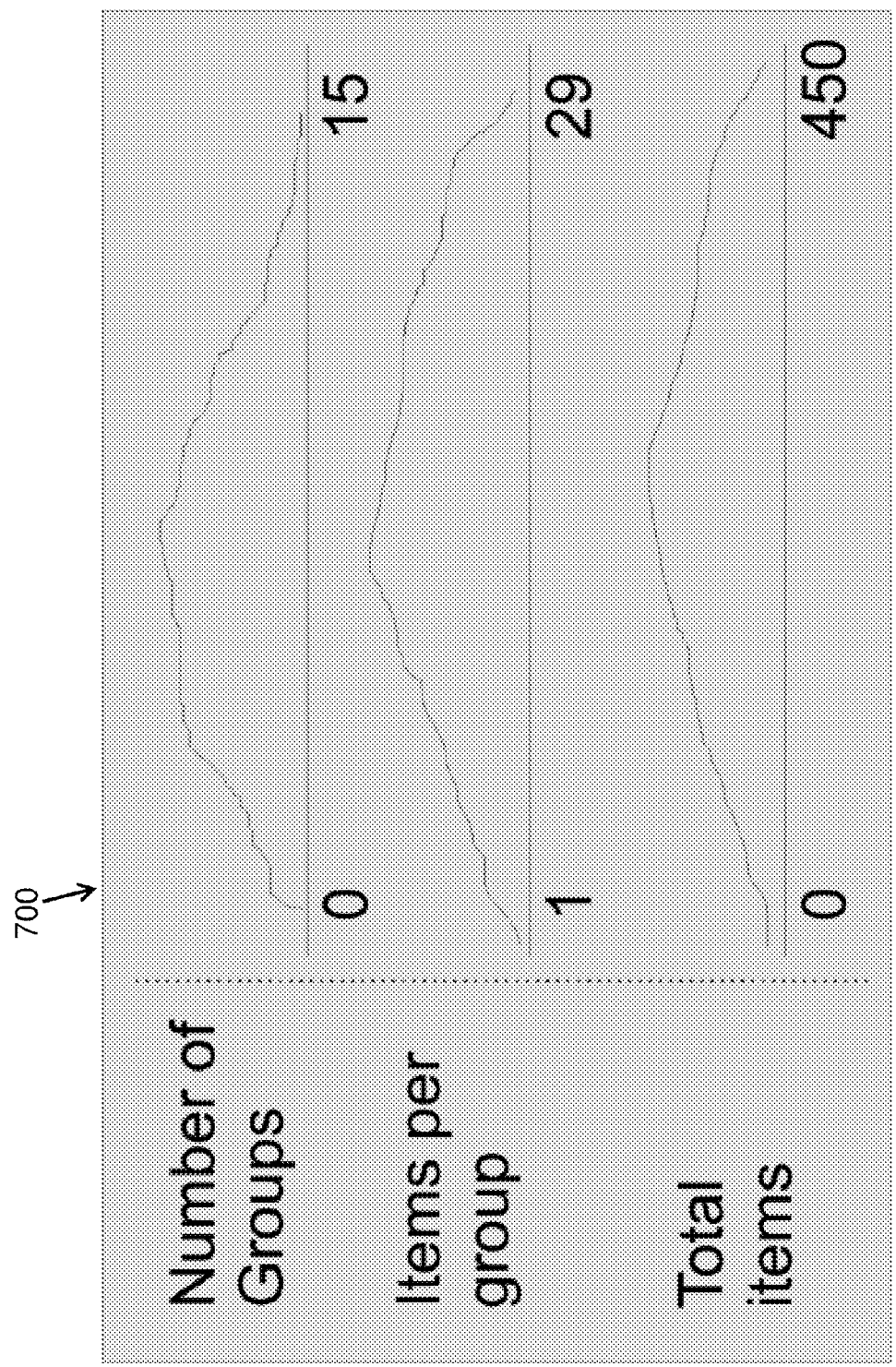
FIG. 7 illustrates a result of a first analytical tool of the review system, according to some embodiments of this disclosure.

FIG. 7 illustrates a result of a first analytical tool 700 of the review system, according to some embodiments. This first tool 700 may analyze various users' use of grouping tools in the review system 100. The user may thus be enabled to analyze how another person uses groups within the specified document. This may be particularly useful for educators or document owners, because it may provide insight as to how the specified document 50 is being used.

A group may be defined in various ways, and may be customizable by the user or by a system administrator. For example, and not limitation, a group may be defined as a collection of document objects 150 grouped together or placed in contact with one another. A group may also refer to sections of text of one or more documents 50 that have been read together, or have been read together at least a predetermined number of times, by collapsing the text between these sections. A group may also refer to two or more portions of text of one or more documents 50 to which a document object 150 refers. As mentioned above, a document object 150 may refer to multiple portions of text from documents 50, which may be taken directly from the document 50 or may themselves be in other document objects 150. These multiple portions of text may be considered a group, because they are made related by the user. More generally, a group may be a collection of document components, which may be portions of one or more documents 50 or document objects 150, for example, and which have been related to one another based on one or more users' interactions with the review system 100.

In some embodiments, a group may include two or more document objects 150 combined based on a user's implicit or explicit instruction to do so. For instance, in addition to being moveable throughout the virtual workspace 120, document objects 150 may also be attachable to one another, to enable the user to rearrange the document objects 150 and the virtual workspace 120 as needed. To attach two or more document objects 150 together, the user may touch and drag one document object 150 until it contacts another. The two document objects 150 may then be attached to each other, and thus combined into a group, until the user touches both of them and drags them away from each other.

In some embodiments, when a group of document objects 150 is formed, moving a primary one of those document objects 150 may cause each of the attached document objects 150 to move together, maintaining their spatial relationships with one another. The primary document object 150 may be, for example, the document object 150 positioned at the highest point in the virtual workspace 120, as compared to the other document objects 150 in the group. Further, other manipulations of the primary document object 150 may affect other document objects 150 in the group. For example, and not limitation, resizing and deletion may be inherited by a document object 150 from the group's primary document object 150, such that the document object 150 may be resized, magnified, or deleted automatically along with the primary document object 150.

Referring back to FIG. 7, the first tool 700 may provide graphs similar to one or more of the graphs shown. In the first graph, a number of groups may occupy the x-axis. The y-axis may represent a probability function for whether a user has the number of groups in the corresponding x-value, or the y-axis may represent the number of users having the specified number of groups of the x-value. In the second graph, the x-axis may represent a number of items per group, and the y-axis may represent a probability function or the number of users whose average number of items per group matches the current number on the x-axis. Alternatively, the y-axis may represent the number of groups having the number of items matching the current number on the x-axis. In the third graph, the x-axis may represent a total number of items in groups, and the y-axis may represent a probability function or the number of users having the number of items matching the current value of the x-axis.

Figure 8:
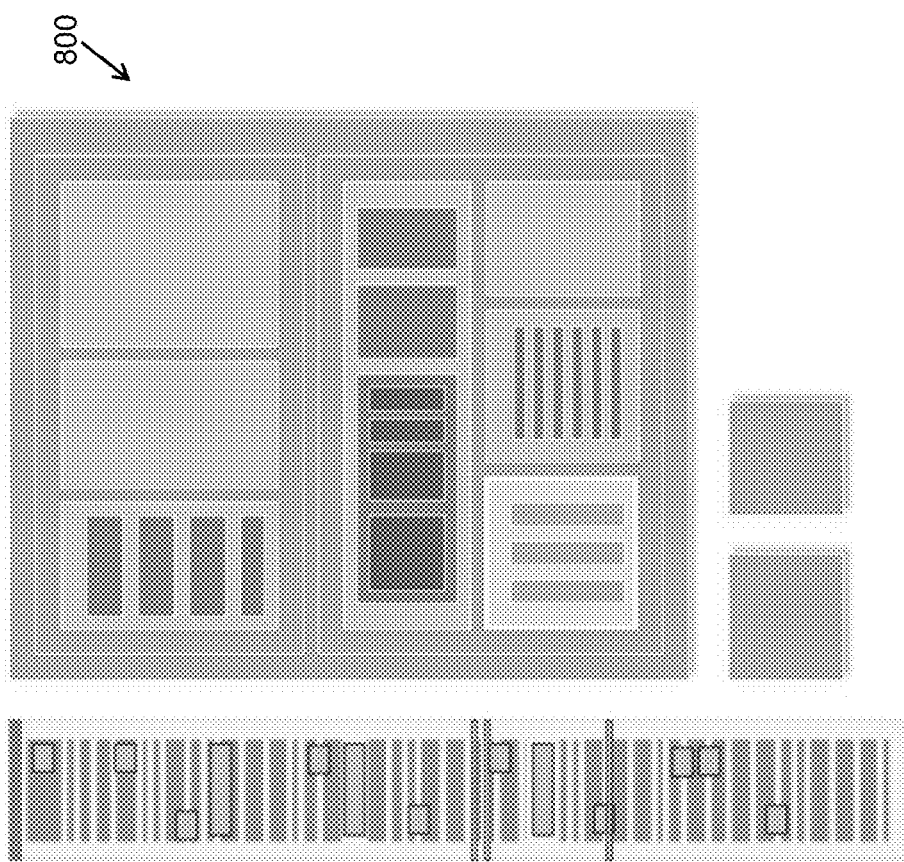
FIG. 8 illustrates a result of a second analytical tool of the review system, according to some embodiments of this disclosure.

FIG. 8 illustrates a result of a second analytical tool 800 of the review system 100, according to some embodiments. At a conceptual level, this second tool 800 may show how groups are used in a selected document. In the image of FIG. 8, each rectangle, with the exception of the outermost one, represented a group. Thus, smaller rectangles contained within larger ones represent groups being grouped together into larger groups. Although not shown, in some embodiments, overlapping rectangles may represent overlapping groups. Further, although only rectangles are illustrated in FIG. 8, it will be understood that other shapes may be used to represent the groups.

Figure 9:
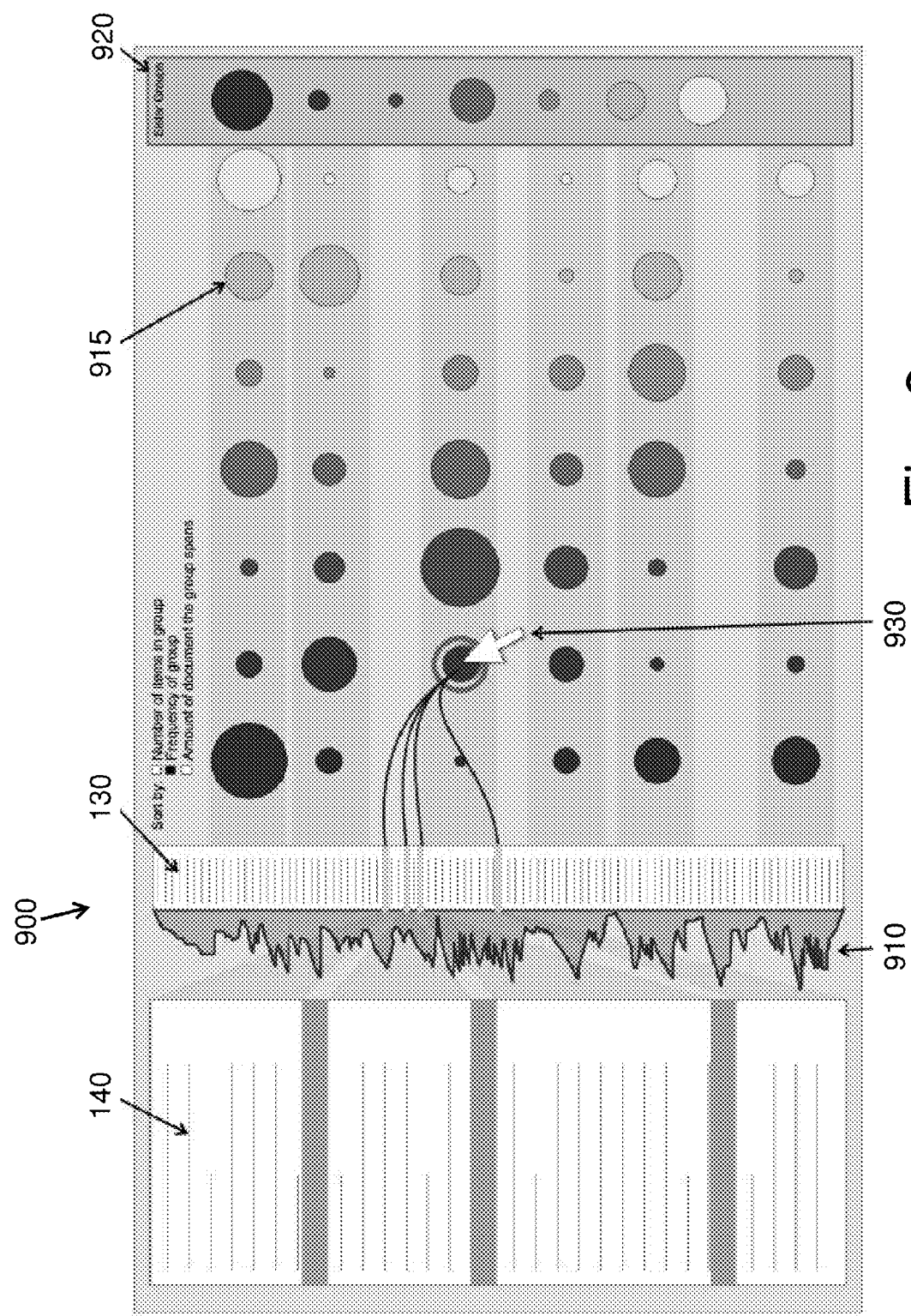
FIG. 9 illustrates a result of a third analytical tool of the review system, according to some embodiments of this disclosure.

FIG. 9 illustrates a result of a third analytical tool 900 of the review system 100, according to some embodiments. As shown, this third tool 900 may provide a document view region 140 and a preview region 130, either or both of which may be zoomable or resizable by the user, along with some additional regions. The document view region 140 may include collapsed portions, as shown. In some embodiments, a probability function 910 may be included and may be adjacent to the preview region 130. The preview region 130 may behave as the x-axis of the probability function 910. The y-axis may extend horizontally away from the preview region 130 and may represent the probability the adjacent text along the x-axis will be excerpted by a user. More specifically, the probability function 910 may show, historically, how frequently a given user or collection of users excerpted the relevant text.

The third tool 900 may further provide representations of the various groups 915 created, or currently existing, by users of the selected document 50 being analyzed. With this tool, however, the definition of a group may include a group of one item, meaning a single excerpt object 152 or annotation object 154. Each circle may represent a group 915. Larger circles may indicate more items within the particular group 915, and darker circles may indicate that the particular grouping is more common among the users being analyzed. It will be understood that shapes other than circles may be used for this purpose.

As shown, the circles may be arranged in a grid format of rows and columns. The rows, defined by a common y-axis position, may roughly represent where in the document 50 each group is located as displayed in the preview region 130. For example, a group 915 representing passages at the beginning of the document 50 may be located in the top row of the grid. A group 915 may include passages located throughout the document 50, and in that case, the applicable circle may be positioned at roughly a central location among those passages.

The columns of the various circles may be determined based on sorting, and in some embodiments, the user may select from among various sorting options. As shown, in this example, the sorting options include: number of items in the group 915, frequency of the group (i.e., how many users used the group), and the amount of the document 50 the group 915 spans. Within their assigned rows, the circles may be arranged based on the selected sort criteria.

The third tool 900 may also provide a region for sister groups 920, which may remain separate from the other groups 915. The sister groups 920 may be related to a particular selected group 930 represented by a selected circle. In this example, the circle in the third row and second column is currently selected. Thus, the sister groups 920 may relate to only the selected group 930 represented by that circle. Specifically, the sister groups may be groups selected by the review system 100 due to often existing in the same virtual workspaces 120 as the selected group 930. As shown, the sister groups 920 may be represented similarly to the other groups, for example, with circles of variable size and darkness. The sister groups 920 may also be sorted based on the selected sort criteria. However, as shown, in this example, they may be sorted top to bottom, or bottom to top, instead of horizontally.

Figure 10:
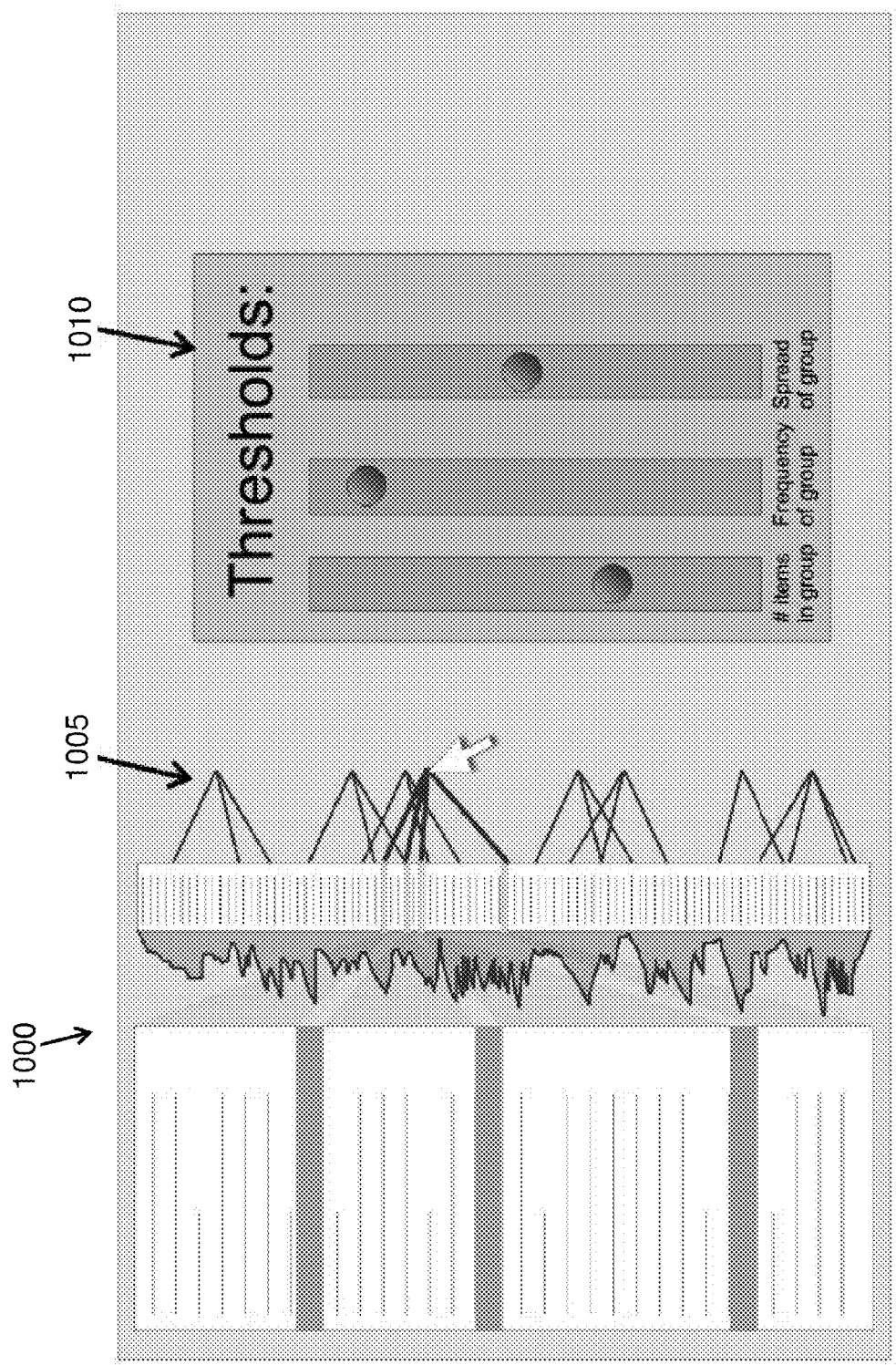
FIG. 10 illustrates a result of a fourth analytical tool of the review system, according to some embodiments of this disclosure.

FIG. 10 illustrates a result of a fourth analytical tool 1000 of the review system 100, according to some embodiments. This fourth tool 1000 may be a variation of the third tool 900 of FIG. 9, including many of same regions, as shown. Again, for the fourth tool 1000, the definition of a group may include a group of a single excerpt object 152 or annotation object 154.

However, instead of circles to represent the groups, each collection of lines coming to a point may represent a group 1005. As shown, these lines may be adjacent to the preview region 130, and they may refer to the passages of the document 50 to which they connect, as displayed in the preview region 130. For instance, the group 1005 referred to by the top collection of lines includes three items, all located toward the beginning of the document 50. When a collection of lines is selected, the review system 100 may interpret this as a selection of the corresponding group 1005, and may display information about that group 1005 in response to the selection. The fourth tool 1000 may further provide a settings region 1010, as shown. In this region, the user may be enabled to select filtering settings for which groups 1005 are represented. Specifically, for the example shown, groups 1005 may be filtered based on the number of items they contain, the frequency with which users create the groups 1005, and the spread of the group across the document 50. By using these settings, the user can increase or reduce the number of groups being represented.

Figure 11:
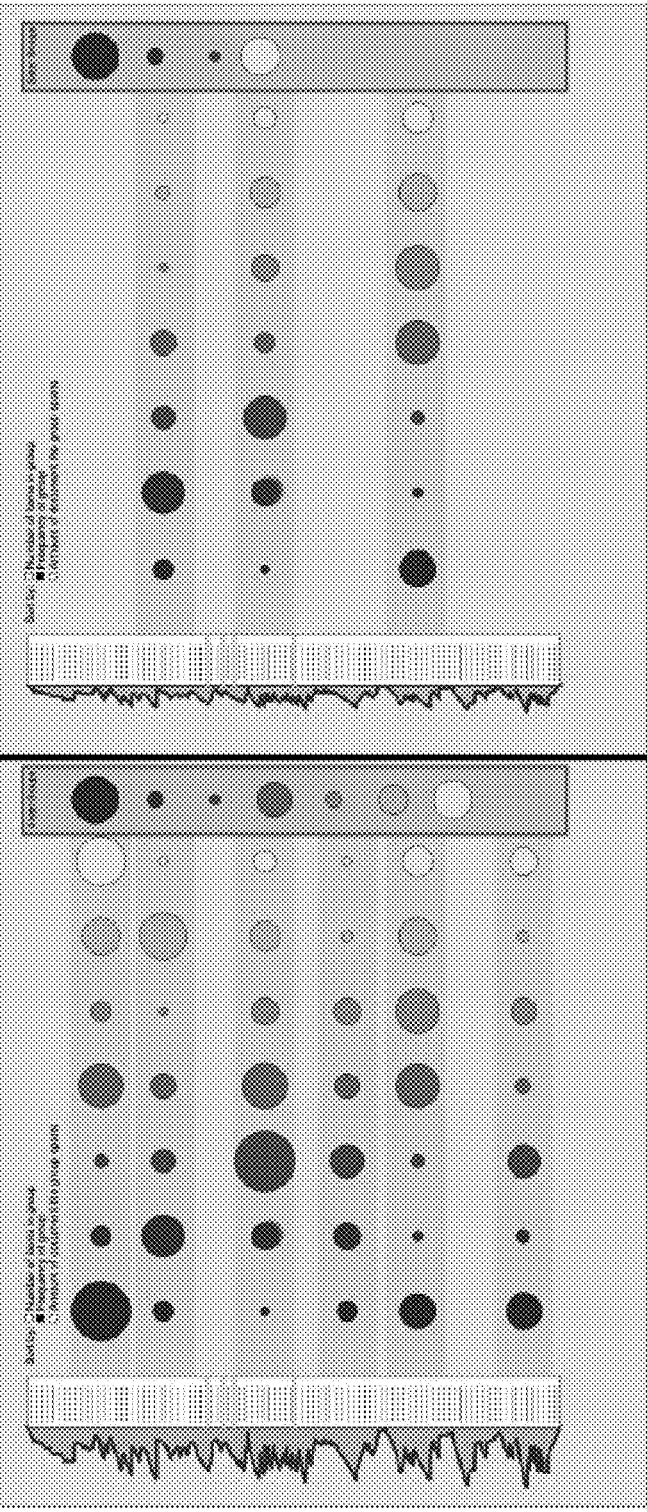
FIG. 11 illustrates a result of a fifth analytical tool of the review system, according to some embodiments of this disclosure.

FIG. 11 illustrates a result of a fifth analytical 1100 tool of the review system 100, according to some embodiments.

As shown, the fifth tool 110 may provide various regions also provided by the third tool 900 of FIG. 9, including, for example, the preview region 130, the probability function 910, sister groups 920, and various circles or other shapes representing groups created by users. Additionally, the fifth tool 1100 may sort the circles in a manner similar to the sorting provided by the third tool 900. Again, for the fifth tool 1100, the definition of a group may include a group of a single excerpt object 152 or annotation object 154.

However, the fifth tool 1100 may separate users into two or more categories based on certain criteria, which may be customizable by the current user. In this example, the criteria used is how the users answered a particular question within or outside the review system 100. Each category of users may be separately graphed, as shown. In this example, a first category of users is represented on the left and a second category of users is represented on the right. In the example given, the users were asked (e.g., on a school test) when the United States fought the war of 1812. Users were assigned to the first set of users if they answered correctly, and those who answered incorrectly with an answer of 1998 were assigned to the second category. In some embodiments, the groups displayed in the results of the fifth tool 1100 may include only groups that are different between the two categories of uses. For example, the left side may include circles for only those groups that were not created, or not frequently created, by users in the second category. Thus, the fifth tool 1100 may use aspects of the third tool 900 to enable comparison between groups created by the students who answered correctly and groups created by the students who answered incorrectly. These comparisons may assist an educator or document owner in analyzing or reworking the document 50 to emphasize the points and relationships focused on by the students who answered correctly.

Figure 12:
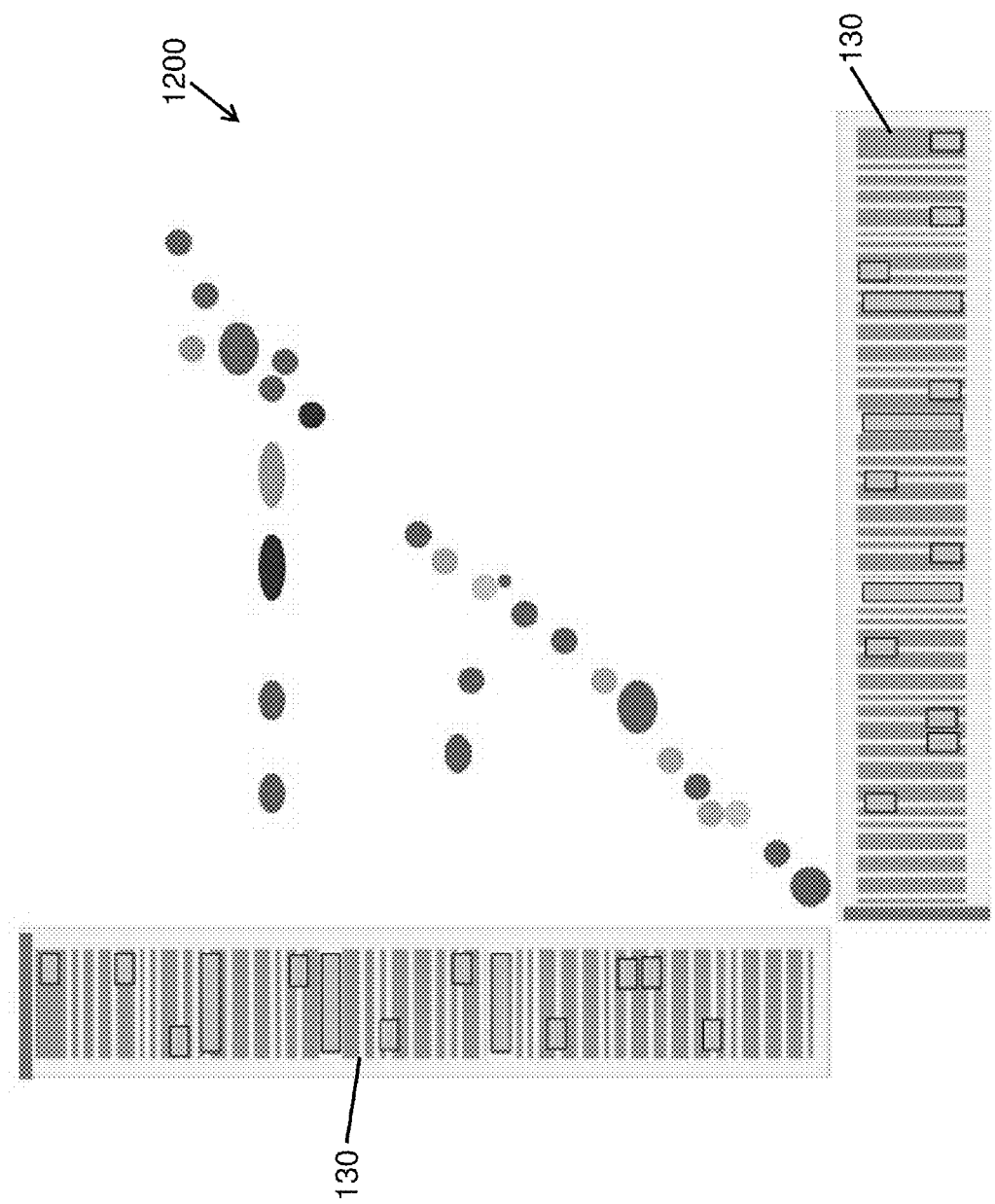
FIG. 12 illustrates a result of a sixth analytical tool of the review system, according to some embodiments of this disclosure.

FIG. 12 illustrates a result of a sixth analytical tool 1200 of the review system 100, according to some embodiments. As shown, the sixth tool 1200 may provide two preview regions 130, one as a horizontal axis and one as vertical axis. The ellipses displayed in the graph created by the two preview regions 130 may indicate which pairs of passages of the document are grouped together. More specifically, an ellipse may appear in a certain position within the graph if groups exist for the aligned passage on the x-axis preview region 130 and the aligned passage on the y-axis preview region 130. Thus, the shape of the ellipse may be based on the length of each passage on the horizontal and vertical axes. The darkness of each ellipse may be based on the frequency with which users make the applicable grouping, where a darker group may indicate a greater frequency. Generally, the graph of ellipses provided by the sixth tool 1200 will be symmetrical, since the x-axis and the y-axis are the same. But for the sake of illustration, and to keep FIG. 12 simple, the graph shown in FIG. 12 displays each ellipse on only one side of the diagonal.

In the example of FIG. 12, it appears that a certain passage in the y-axis preview region 130 is repeatedly referred to in groups, and thus, many ellipses appear along that line. This tells the user that other users find the information in that passage important enough to focus on. This information may be useful to an educator or document owner.

In some embodiments, the groups relevant to the sixth tool 1200 may be only those groups created by collapsing text, where each group represents a pairing of the passage below the collapsed text and the passage above the collapsed text. In other embodiments, however, other groups may also be explored by this sixth tool 1200.

Figure 13:
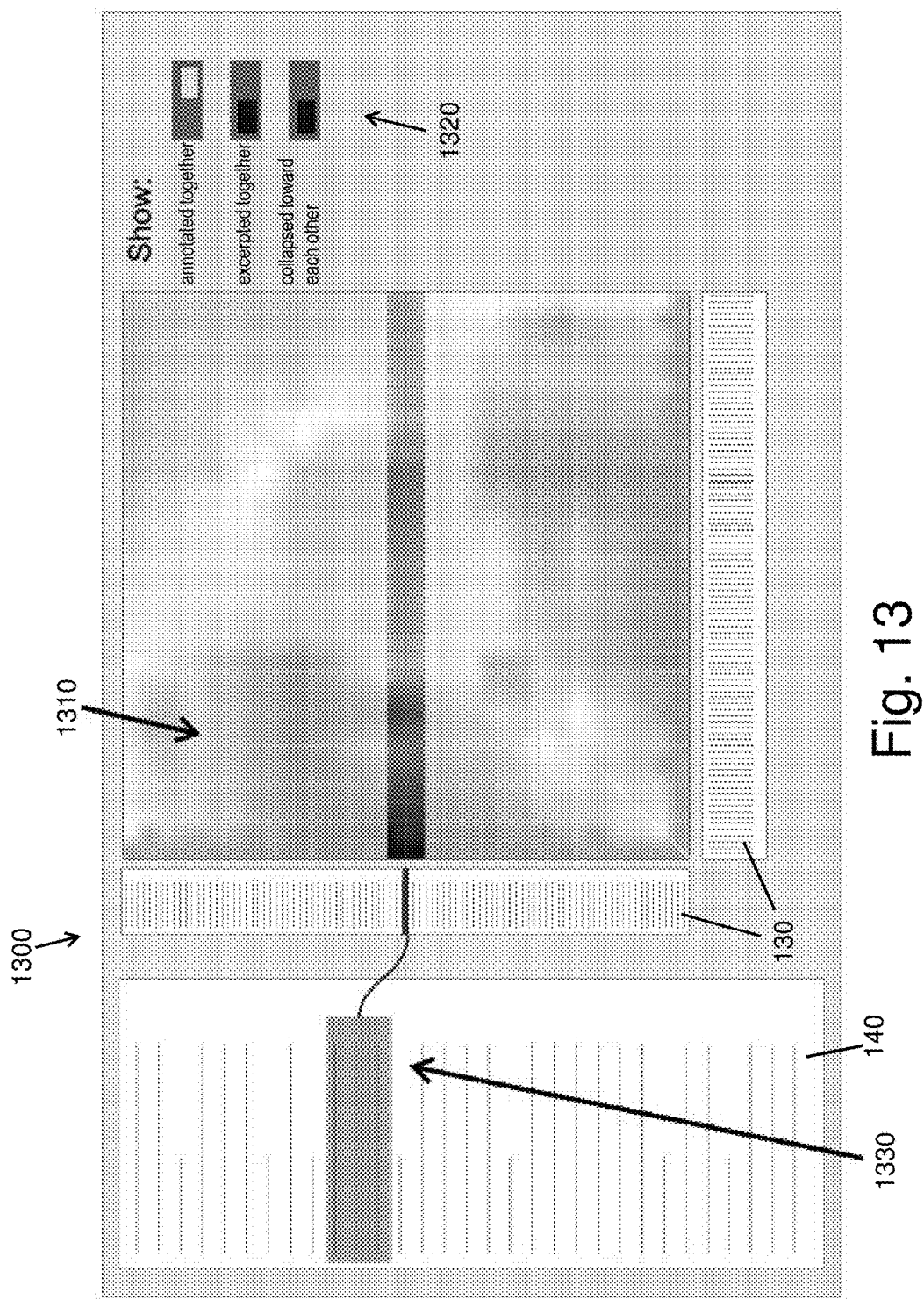
FIG. 13 illustrates a result of a seventh analytical tool of the review system, according to some embodiments of this disclosure.

FIG. 13 illustrates a result of a seventh analytical tool 1300, according to some embodiments. The seventh tool 1300 may be conceptually similar to the sixth tool 1200 of FIG. 12. For example, as shown, the seventh tool 1300 may include an x-axis preview region 130 and a y-axis preview region 130, each of which may display the entire document 50 being analyzed. However, instead of ellipses, as used by the sixth tool 1200, the seventh tool 1300 may provide a heat map 1310. Similar to the ellipses of FIG. 12, the heat map 1310 may indicate which passages of the document 50 are grouped together by users. For example, darker areas in the heat map 1310 may indicate that a greater frequency of groupings occurred for the aligned passages in the x-axis and y-axis preview regions 130, as compared to lighter areas of the heat map 1310.

Additionally, the seventh tool 1300 may provide a settings region 1320, which may enable the user to select which types of groups are being analyzed by the heat map 1310. The seventh tool 1300 may further provide a document view region 140, which may display a full, scrollable version of the document 50. When the user selects a passage in the document view region 140, as shown, the corresponding strip of the heat map 1310 may be emphasized automatically in response. The mechanism of emphasis may vary. For example, as shown, the emphasized area may appear darker than other areas of the heat map 1310.

Figure 14:
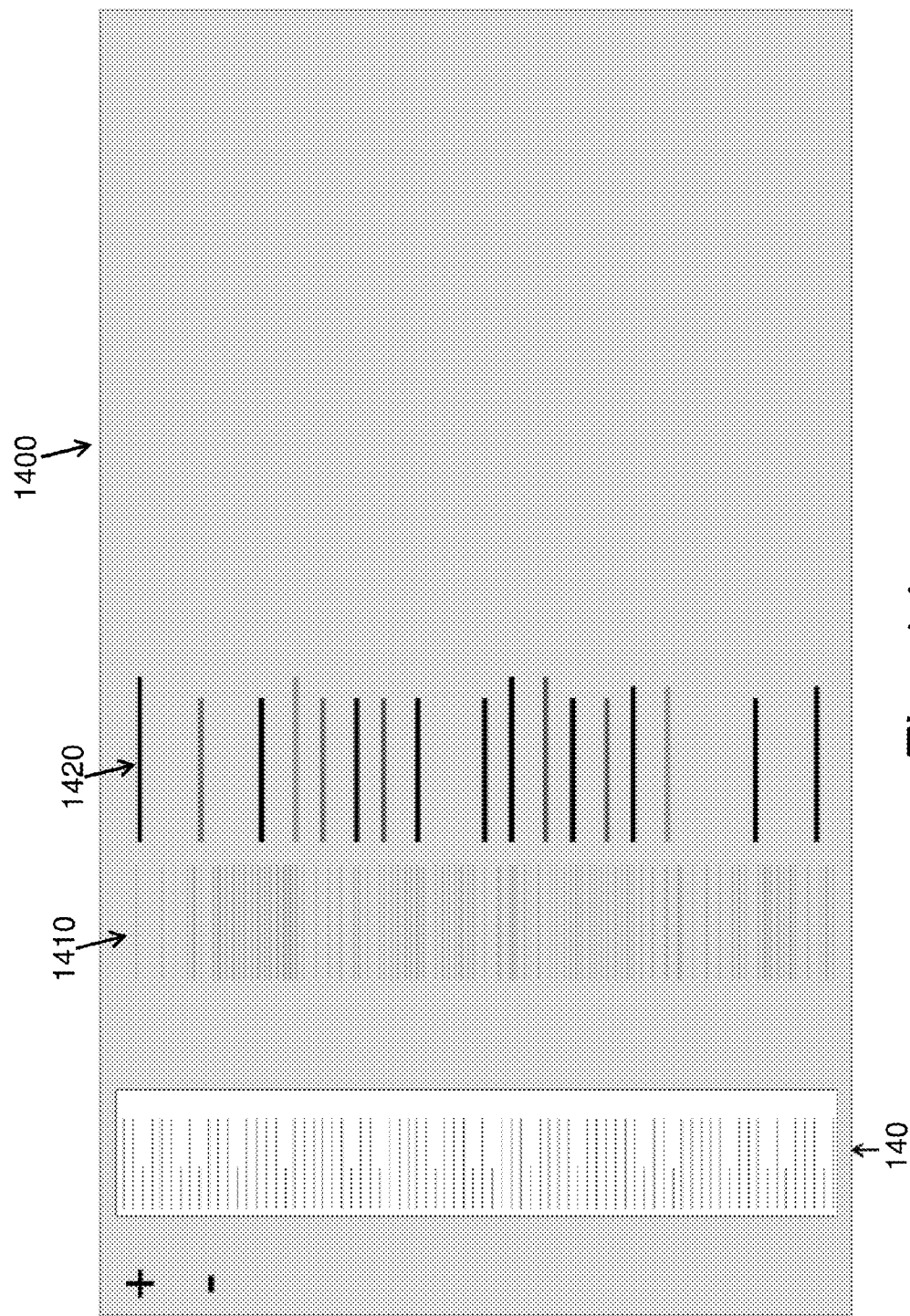
FIG. 14 illustrates a result of an eighth analytical tool of the review system, according to some embodiments of this disclosure.

FIG. 14 illustrates a result of an eighth analytical tool 1400 of the review system 100, according to some embodiments. As shown, the eighth tool 1400 may provide a document view region 140, a density indicator 1410, and a list of commented words 1420 (i.e., words used in comments), where the list of commented terms 1420 acts as a comment cloud.

The document view region 140 may be scrollable and zoomable. The density indicator 1410 may be a set of lines in various shades of gray, or some other color. The commented words list 1420 may display words that are frequently commented in the document 50. More specifically, the words included in the commented words list 1420 at a given y-position may be the words that users of the review system 100 tend to include in their comments on the area of the document 50 vertically aligned with the given y-position. In other words, each y-position may be associated with its own comment cloud of frequently commented words. The lines in the density indicator 1410 may likewise represent words that users often include in their comments. The review system 100 may select which words to show at full size in the commented words list 1420 versus the density indicator 1410 based on certain criteria, which may be customizable and may be related to the frequency with which users use that word in their comments.

Because many comments may have been created by users in the selected document 50, it may be the case the density of comments is too much such that all words of all comments are readable at once. The density indicator 1410 may enable the user to determine whether more commented words would be available at a higher magnification. More specifically, for example, the existence of a line in the density indicator 1410 may indicate that more commented words exist for the passage of the document 50, as displayed in the document view region 140, aligned with the line in question. The darkness of line may indicate how close the user is to being able to see the actual words. For instance, if the user is close, a line may be black or near-black, and the user will not need to zoom much farther to see the commented words not yet visible. The more commented words there are for a passage of the document 50, the more the document 50 may need to be magnified to see all the commented words. After the zoom level is such that all commented words for a passage of the document 50 are viewable, the commented words may appear in the commented words list 1420.

In some embodiments, when the zoom level is almost enough to result in commented words being displayed and readable, the corresponding line in the density indicator 1410 may slide over to the commented words list 1420, although no words are yet readable. This may provide further indication to the user that commented words are almost ready to be displayed. In some further embodiments, when the line from the density indicator 1410 slides over, that line may then be replaced with the applicable commented words in tiny font, which may increase in size as the zoom level continues to increase.

When the user seeks to exit the review system 100 but would like to retain the state of the virtual workspace 100, the review system 100 may enable the user to save the current state of the virtual workspace 120. For example, the review system 100 may export the virtual workspace 120 by printing to paper, printing to Adobe PDF, exporting to text format, or exported to an image. For further example, the review system 100 may be associated with a proprietary document format. If the user saves the virtual workspace 120 in this format, then the user may return to the virtual workspace 120 to continue active reading in the same state in which the virtual workspace 120 was saved.

Embodiments of the review system 100 have numerous practical applications, including use by attorneys, students, and analysts, for example.

When patent attorneys evaluate issued patents, they often read the claims of those patents while continually referring to the description and drawings that set their context. With standard word processing systems, this entails scrolling back and forth between sections of patent documents, which is even more difficult on a tablet as compared to a desktop or notebook computer. With paper, the attorney would need to handle multiple distinct physical documents, while trying to keep track of notes, underlining, and highlighting across numerous pages. In contrast, some embodiments of the review system 100 enable a user to remain aware of context by viewing excerpts and notes of multiple documents 50 within a single virtual workspace 120.

When a student writes a report under common core, that student is required to support her points with evidence, to organize that evidence, and to use technology to present relationships between information and ideas. However, because conventional word processing makes content rigid, it is difficult to interconnect aspects of the evidence being considered. However, the groupings, analytics, and other tools of some embodiments the review system 100 may make the students' required tasks easy.

When an analyst prepares a summary of the energy sector, for example, that analyst has to extract and synthesize facts and ideas from a numerous different reports. While conventional word processing enables the analyst to copy and paste quotations into a document for later use, no tools are provided by conventional word processing to build on or organize those quotations into something meaningful. Further, context around the copied quotations is lost when pasting them into a new document. In contrast, some embodiments of the review system 100 enable organizing materials from multiple documents flexibly and in continued association with the context.

Figure 15:
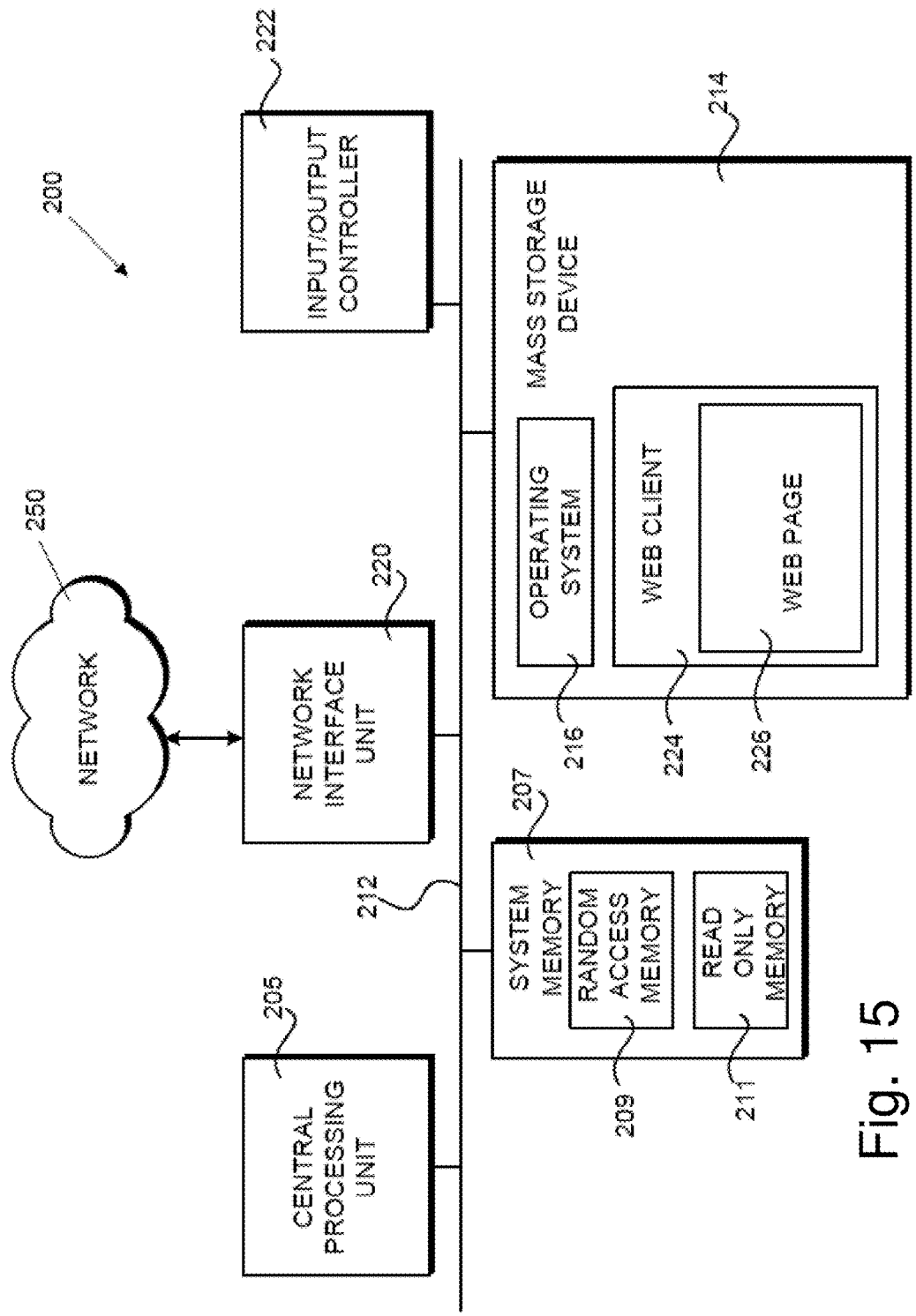
FIG. 15 illustrates an architecture of a computing device for providing the review system, according to some embodiments of this disclosure.

The review system 100 may be embodied in a computer-readable medium and executed by a computer processor to provide one, some, or all aspects of the various embodiments of this disclosure. For example, the review system 100 may be integrated into a computing device 200, such as by being embodied in a software application installed on the computing device. FIG. 15 illustrates an architecture of a computing device into which the review system 100 may be integrated. Those skilled in the art will recognize that the general architecture described with reference to FIG. 15 is for example only, and may be modified to accommodate various embodiments of the review system 100 and particular operational environments.

As shown in FIG. 15, a computing device 200 embodying the review system 100 may comprise a central processing unit 205 and one or more system memories 207, such as a random access memory 209 ("RAM") and a non-volatile memory, such as a read-only memory ("ROM") 211. The computing device 200 may further comprise a system bus 212 coupling together the memory 207, the processing unit 205, and various other components. A basic input/output system containing routines to assist in transferring information between components of the computing device 200 may be stored in the ROM 211. Additionally, the computing device 200 may include a mass storage device 214 for storing an operating system 216, application programs, and other program modules.

The mass storage device 214 may be connected to the processing unit 205 through a mass storage controller (not shown) connected to the bus 212. The mass storage device 214 and other computer-readable media may comprise computer storage media, which may include volatile and non-volatile, removable and non-removable media implemented in any method or technology for storage of information, such as computer-readable instructions, data structures, program modules, or other data. Computer storage media includes, but is not limited to, RAM, ROM, EPROM, EEPROM, flash memory, other solid state memory technology, CD-ROM, digital versatile disks ("DVD"), other optical storage, magnetic cassettes, magnetic tape, magnetic disk storage, other magnetic storage devices, or various other media used to store data accessible by the computing device 200.

A number of program modules and data files may be stored in the computer storage media and RAM 209 of the computing device 200. Such program modules and data files may include an operating system 216 suitable for controlling operations of a networked personal computer. A web browser application program, or web client 224, may also be stored on the computer storage media and RAM 209. The web client 224 may comprise an application program for requesting and rendering web pages 226 created in Hypertext Markup Language ("HTML") or other types of markup languages. The web client 224 may be capable of executing scripts through the use of a scripting host. The scripting host executes program code expressed as scripts within the browser environment.

Computer-readable instructions on the storage media of the computing device 200 may include, for example, instructions for implementing processes of the review system 100 or for implementing a web client 224 for receiving instructions from the review system 100 when operated remotely. These instructions may be executed by the computer processor 205 to enable use of the review system 100.

The computing device 200 may operate in a networked environment using logical connections to remote computers over a network 250, such as the Internet. The computing device 200 may connect to the network 250 and remote computers through a network interface unit 220 connected to the bus 212.

The computing device 200 may also include an input/output controller 222 for receiving and processing input from a number of input devices, including a keyboard, mouse, or electronic stylus. Interactions between the input devices and the review system 100 may be detected by the input/output controller 222 to provide meaningful input to the computing device 200. The input/output controller 222 may additionally provide output to a display screen, a printer, or other type of input/output device, such as the multi-touch input device 110 or other appropriate input device of the review system 100.

The hardware and virtual components described above may work in combination to provide various aspects and operations of the review system 100, as will be described in detail below.

Embodiments of the review system may thus be used to facilitate active reading, by providing a fluid-like, non-rigid, reading environment customizable by a user. While the review system has been disclosed in example forms, many modifications, additions, and deletions may be made without departing from the spirit and scope of the system, method, and their equivalents, as set forth in the following claims.

What is claimed is:

1. A computer implemented method comprising:
generating a first document object associated with a portion of a first document, the first document object being moveable throughout a virtual workspace and comprising:
a first source link referencing the portion of the first document, wherein selection of the first source link prompts display of the portion of the first document; and
generating a second document object associated with a portion of a second document, the second document object being moveable throughout the virtual workspace and comprising:
a second source link referencing the portion of the second document, wherein selection of the second source link prompts display of the portion of the second document;
wherein the second document object is distinct from the first document object;
wherein the first document object is positioned outside the first document;
wherein the second document object is positioned outside the second document; and
wherein the second document object shares the virtual workspace with the first document object.

2. The computer-implemented method of claim 1, further comprising:
displaying the first document in a first document view region of a virtual workspace;
receiving a hold gesture at a selected location corresponding to a portion of the first document;
receiving an instruction to open a file while the hold gesture at the selected location remains active, wherein the file comprises the second document;
opening the second document of the file in a second document view region responsive to receiving the instruction to open the second document; and
positioning automatically the second document view region based on the selected location, wherein the positioning is responsive to receiving the instruction to open the file while the hold gesture at the selected location remains active, and wherein the portion of the first document remains visible upon opening the second document.

3. The computer-implemented method of claim 1, wherein the first document object comprises an excerpt of the first document, and wherein the excerpt of the first document corresponds to the portion of the first document.

4. The computer-implemented method of claim 3, wherein the second document object comprises an excerpt of the second document, and wherein the excerpt of the second document corresponds to the portion of the second document, the method further comprising:
combining the first document object and the second document object into a group, wherein a manipulation of the first document object is inherited by the second document object.

5. The computer-implemented method of claim 3, wherein the second document object comprises an excerpt of the second document, and wherein the excerpt of the second document corresponds to the portion of the second document, the method further comprising:
receiving a selection of the first source link;
automatically scrolling the first document to make the portion of the first document visible in the first document view region;
receiving a selection of the second source link while the selection of the first source link remains active; and
automatically scrolling the second document to make the portion of the second document visible in the second document view region while the portion of the first document is visible in the first document view region, responsive to the selection of the second source link while the selection of the first source link remains active.

6. The computer-implemented method of claim 1, further comprising:
searching for a search term in the first document and the second document;
identifying a first instance of the search term in the first document;
automatically scrolling the first document to display the first instance of the first term in the first document view region, responsive to identifying the first instance of the search term in the first document;
identifying a second instance of the search term in the second document; and
automatically scrolling the second document to display the second instance of the search term in the second document view region while the first instance of the search term is visible in the first document view region, responsive to identifying the second instance of the search term in the second document.

7. The computer-implemented method of claim 6, further comprising:
identifying a third instance of the search term in a third document that is not open; and
responsive to identifying the third instance of the search term in the third document that is not open:
opening the third document in a third document view region; and
scrolling the third document to display the third instance of the search term in the third document view region while the first instance of the search term is visible in the first document view region and while the second instance of the search term is visible in the second document view region.

8. The computer-implemented method of claim 1, further comprising:
forming two or more groups, each group comprising two or more document components of the first document;

graphically illustrating the two or more groups by displaying a shape corresponding to each group, wherein a first shape contained within a second shape represents a first group of document components corresponding to the first shape being a subset of a second group of document components corresponding to the second shape.

9. The computer-implemented method of claim 1, further comprising:
forming two or more groups, each group comprising two or more document components of the first document;
displaying a preview region representing a layout of the first document; and
generating a probability graph vertically along the preview region;
wherein the probability graph comprises a plurality of points arranged vertically, each point representing a respective line of the first document, and wherein each point has a vertical position along the preview region aligned with a vertical position of the respective line of the first document; and
wherein each point on the probability graph represents a frequency at which the respective line of the first document is included in the two or more groups.

10. The computer-implemented method of claim 1, further comprising:
forming two or more groups, each group comprising two or more document components of the first document;
displaying a preview region representing a layout of the first document;
generating a plurality of shapes, each shape representing a corresponding group of document components; and
aligning the plurality of shapes with the preview region to indicate a position of the corresponding group of document components in the first document.

11. The computer-implemented method of claim 10, wherein a size of a first shape of the plurality of shapes indicates a count of document components in a first group of document components corresponding to the first shape.

12. The computer-implemented method of claim 1, further comprising:
receiving an indication that a first set of users answered a sample question correctly;
receiving, from each user in the first set of users who answered the sample question correctly, an instruction to form a first group of documents objects associated with one or more documents and moveable throughout a respective virtual workspace;
receiving an indication that a second set of users answered the sample question incorrectly;
receiving, from each user in the second set of users who answered the sample question incorrectly, an instruction to form a second group of documents objects associated with one or more documents and moveable throughout a respective virtual workspace;
displaying side-by-side a representation of the first set of groups of document objects formed based on instructions from the first set of users who answered the sample question correctly and a representation of the second set of groups of document objects formed based on instructions from the second set of users who answered the sample question incorrectly.

13. The computer-implemented method of claim 1, displaying a plurality of comment clouds, comprising a comment cloud associated with each line of the first document, wherein each comment cloud represents words present in comments associated with a respective line of the first document;
wherein the displaying a first comment cloud of the plurality of comment clouds comprises:
selecting a first subset of words most frequently present in the comments associated with a first line of the first document; and
displaying the first subset of words in the first comment cloud;
receiving an instruction to magnify the first document in the first document view region; and
adding one or more words to the plurality of comment clouds based on a magnification of the first document in the first document view region, responsive to receiving the instruction to magnify the first document;
wherein the adding the one or more words to the plurality of comment clouds based on the magnification of the first document comprises:
identifying at least one word that is present in the comments associated with the first line of the first document and that is excluded from the first subset of words; and
adding the at least one word to the first comment cloud, responsive to receiving the instructions to magnify the first document.

14. The computer-implemented method of claim 1, further comprising:
displaying the first document in a first document view region;
displaying the second document in a second document view region, wherein the first document and the second document are simultaneously visible to a user;
receiving a hold gesture at a second portion of the first document and at a second portion of the second document;
generating an annotation object referencing the first document and the second document, responsive to the hold gesture at the second portion of the first document and at the second portion of the second document, the annotation object comprising a first annotation source link associated with the first document and a second annotation source link associated with the second document, wherein the second annotation source link is distinct from the first annotation source link;
receiving a text input in the annotation object referencing the first document and the second document; and
displaying the text input in the annotation object referencing the first document and the second document;
wherein the first annotation source link of the annotation object references the second portion of the first document where the hold gesture was received, and wherein selection of the first annotation source link in the annotation object prompts display of the second portion of the first document; and
wherein the second annotation source link of the annotation object references the second portion of the second document where the hold gesture was received, and wherein selection of the second annotation source link in the annotation object prompts display of the second portion of the second document, wherein the second document is a distinct document from the first document.

15. The computer-implemented method of claim 14, further comprising:

receiving a second hold gesture at a second location corresponding to a second portion of the second document;

receiving a selection of the first annotation source link while the second hold gesture at the second location remains active; and automatically scrolling the first document to make the portion of the first document visible in the first document view region while the second portion of the second document remains visible and at the second location, responsive to the selection of the first annotation source link while the second hold gesture at the second location remains active.

16. The computer-implemented method of claim 14, wherein the annotation object comprises an excerpt from at least one of the second portion of the first document and the second portion of the second document.

17. The computer-implemented method of claim 1, further comprising:

generating a third document object comprising:
 a third source link referencing a portion of a third document that is not open, wherein selection of the third source link prompts opening of the third document and display of the portion of the third document.

18. A computer-implemented method comprising:

displaying a first document in a first document view region;

receiving a search term applicable to the first document;

receiving a collapse gesture applicable to the first document and in association with the search term; and identifying two or more portions of the first document comprising the search term, in response to receiving the search term and to the collapse gesture;

identifying an intermediate portion of the first document positioned between the two or more portions of the first document comprising the search term, in response to receiving the search term and to the collapse gesture;

repositioning at least one of the two or more portions of the first document comprising the search term by vertically squishing the intermediate portion of the first document, in response to receiving the search term and to the collapse gesture;

wherein, responsive to receiving the search term and to the collapse gesture, the two or more portions of the first document comprising the search term are closer together after the repositioning the at least one of the two or more portions of the first document by vertically squishing the intermediate portion of the first document.

19. A computer-implemented method comprising:
displaying a first document in a document view region;
highlighting a first portion of the first document;
highlighting a second portion of the first document;
receiving a collapse gesture applicable to the first document and in association with the highlighting the first portion and the highlighting the second portion; and
responsive to the collapse gesture:
 identifying a second intermediate portion of the first document positioned between the highlighted first portion and the highlighted second portion of the first document;
 repositioning at least one of the highlighted first portion and the highlighted second portion of the first document by modifying the second intermediate portion of the first document in response to the collapse gesture;
 wherein the highlighted first portion and the highlighted second portion of the first document are closer together after the repositioning the at least one of the highlighted first portion of the first document and the highlighted second portion of the first document.

20. The computer-implemented method of claim 2, further comprising:

assigning to a predetermined region of the virtual workspace an option to open a document-selection dialog, wherein the document-selection dialog enables selection from among two or more available files distinct from the first document;

wherein the receiving the instruction to open the file while the hold gesture at the selected location remains active comprises:
 receiving a touch gesture at the predetermined region of the virtual workspace while the hold gesture at the selected location corresponding to the portion of the first document remains active;
 opening the document-selection dialog responsive to the touch gesture occurring at the predetermined region of the virtual workspace;
 receiving a drag gesture coupled to the touch gesture at the predetermined region of the virtual workspace;
 extending the document-selection dialog responsive to the drag gesture;
 displaying representations of the two or more available files in the document-selection dialog; and
 receiving, at the document-selection dialog, a selection of the file from among the two or more available files in the document-selection dialog.

* * * * *